United States Patent
Farmanbar et al.

(10) Patent No.: US 10,812,395 B2
(45) Date of Patent: Oct. 20, 2020

(54) SYSTEM AND METHOD FOR POLICY CONFIGURATION OF CONTROL PLANE FUNCTIONS BY MANAGEMENT PLANE FUNCTIONS

(71) Applicants: Hamidreza Farmanbar, Ottawa (CA); Sophie Vrzic, Kanata (CA)

(72) Inventors: Hamidreza Farmanbar, Ottawa (CA); Sophie Vrzic, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/792,331

(22) Filed: Oct. 24, 2017

(65) Prior Publication Data
US 2018/0123961 A1 May 3, 2018

Related U.S. Application Data

(60) Provisional application No. 62/415,044, filed on Oct. 31, 2016, provisional application No. 62/442,830, filed on Jan. 5, 2017.

(51) Int. Cl.
*H04L 12/26* (2006.01)
*H04L 12/813* (2013.01)
(Continued)

(52) U.S. Cl.
CPC .......... *H04L 47/20* (2013.01); *H04L 41/0806* (2013.01); *H04L 41/0893* (2013.01);
(Continued)

(58) Field of Classification Search
CPC ............. H04L 41/0806; H04L 41/0866; H04L 41/0893; H04L 41/0896; H04L 47/20; H04L 47/22; H04L 47/2408; H04L 47/805
See application file for complete search history.

(56) References Cited

U.S. PATENT DOCUMENTS

| 10,361,843 B1 * | 7/2019 | Suthar ................. G06F 9/45558 |
| 2008/0247314 A1 * | 10/2008 | Kim .................... H04L 41/0816 370/235 |

(Continued)

FOREIGN PATENT DOCUMENTS

| CN | 103236945 A | 8/2013 |
| CN | 103391564 A | 11/2013 |

(Continued)

OTHER PUBLICATIONS

International Search Report dated Mar. 1, 2018 for corresponding International Application No. PCT/CN2017/108190 filed Oct. 28, 2017.

(Continued)

*Primary Examiner* — Minh Trang T Nguyen

(57) ABSTRACT

A system and method for policy configuration of control plane functions by management plane functions. In an embodiment a management plane entity is operative to transmit, to a policy control function (PCF), a policy related to network slice operations of the network slice and related to total available network slice resources for the network slice. The policy control function (PCF) operative to apply the policy to configure control plane functions for that network slice.

18 Claims, 16 Drawing Sheets

(51) Int. Cl.
  *H04L 12/24* (2006.01)
  *H04L 12/815* (2013.01)
  *H04L 12/851* (2013.01)
  *H04L 12/927* (2013.01)
  *H04W 28/02* (2009.01)

(52) U.S. Cl.
  CPC ...... *H04L 41/0896* (2013.01); *H04L 41/5054* (2013.01); *H04L 43/0888* (2013.01); *H04L 47/22* (2013.01); *H04L 47/2408* (2013.01); *H04L 47/805* (2013.01); *H04W 28/0247* (2013.01); *H04L 41/5096* (2013.01)

(56) References Cited

U.S. PATENT DOCUMENTS

| | | | |
|---|---|---|---|
| 2012/0084371 A1 | 4/2012 | Rajagopalan et al. | |
| 2015/0256414 A1 | 9/2015 | Koide | |
| 2015/0312102 A1 | 10/2015 | Backholm et al. | |
| 2017/0222889 A1 | 8/2017 | Zong et al. | |
| 2017/0332421 A1* | 11/2017 | Sternberg | H04W 76/11 |
| 2018/0324576 A1* | 11/2018 | Salkintzis | H04W 36/0027 |

FOREIGN PATENT DOCUMENTS

| | | |
|---|---|---|
| CN | 103905523 A | 7/2014 |
| CN | 104620546 A | 5/2015 |
| CN | 105812217 A | 7/2016 |
| CN | 106060900 A | 10/2016 |
| WO | 03085901 A1 | 10/2003 |
| WO | 2015196733 A1 | 12/2015 |
| WO | 2017197273 A1 | 11/2017 |

OTHER PUBLICATIONS

3GPP TS 32.401 (V13.2.0), "3rd Generation Partnership Project; Technical Specification Group Services and System Aspects; Telecommunication management; Performance Management (PM); Concept and requirements" (Release 13), Jun. 2017.

3GPP TR 23.799 (V14.0.0), "3rd Generation Partnership Project; Technical Specification Group Services and System Aspects; Study on Architecture for Next Generation System" (Release 14), Dec. 2016.

Huawei:"Add use case and requirements for policy configuration", 3GPP TSG SA WG5 (Telecom Management) Meeting #110, S5-166152, Nov. 14-18, 2016, Reno (US), total 2 pages. XP051200651.

3GPP TR 23.799 V1.0.2, "3rd Generation Partnership Project;Technical Specification Group Services and System Aspects; Study on Architecture for Next Generation System (Release 14)", 3GPP Standard;Sep. 30, 2016, pp. 1-423, XP051172701.

* cited by examiner

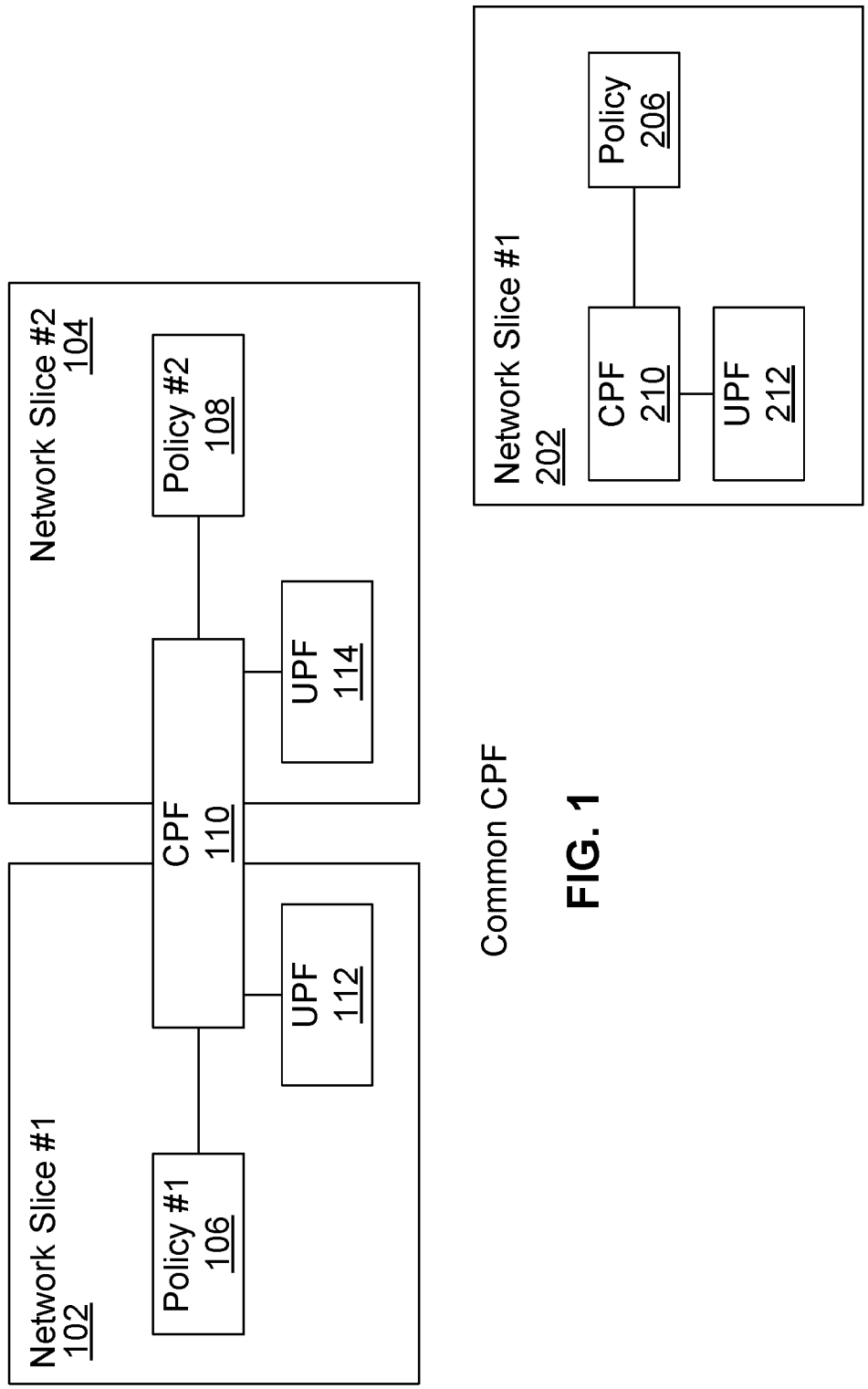

SYSTEM AND METHOD FOR POLICY CONFIGURATION OF CONTROL PLANE FUNCTIONS BY MANAGEMENT PLANE FUNCTIONS

CROSS REFERENCE TO RELATED APPLICATIONS

This application is related to U.S. Provisional Patent Application Ser. No. 62/415,044, entitled, "System and Method for Policy Configuration of a Control Plane Function by the Management Plane," filed Oct. 31, 2016, and to U.S. Provisional Patent Application Ser. No. 62/442,830, entitled "System and Method for Policy Configuration of Control Plane Functions by Management Plane Functions," filed Jan. 5, 2017, the contents of which are incorporated herein by reference, inclusive of all filed appendices.

FIELD OF THE INVENTION

The present invention pertains to the field of wireless network communications, and in particular to a method and apparatus for providing slice specific policy configuration of control plane functions (CPF) by the management plane.

BACKGROUND

Network slicing provides customized treatment for different services with diverse QoS requirements given common physical network resources. Further, the network functions within the Evolved Packet Core (EPC) of the LTE wireless communication standard are configurable via operation policies. These policies are sets of conditions, constraints, and settings that shape the network behaviour by defining rules on quality of service (QoS), gating, traffic routing, congestion management, etc.

However, a critical problem in network slicing involves that shaping of behaviour of the network slices such that the services supported by one slice are not negatively affected by the service supported by other slices.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the present invention, there is provided a policy configuration of control plane functions by the management plane system comprising: at least one management component configured to provide support for policy configurations of control plane functions and for the monitoring and enforcement of the policy configurations. The policy configurations can be applied to either slice specific control plane functions or common control plane functions.

In an embodiment, a method is for configuring a control plane function associated with a network slice available on a network. The method comprising a management plane entity: transmitting, to a policy control function (PCF), a policy related to network slice operations of the network slice and related to total available network slice resources for the network slice, the policy control function (PCF) operative to apply the policy to configure control plane functions for that network slice.

In an implementation the method further comprises transmitting to the PCF a plurality of policies related to network operations of a corresponding plurality of network slices, the PCF further operative to apply each of the plurality of policies to configure control plane functions for a corresponding one of the plurality of network slices.

In an implementation the method further comprises the management plane entity: based on a network slice resource update trigger, transmitting a request to a management and orchestration (MANO) component to reserve resources for the network slice; and, transmitting a resource allocation update to the control plane function.

In an implementation the method further comprises the management plane entity: receiving network slice resource usage monitoring results; determining whether the network slice resource usage monitoring results violate the policy; and, if the network slice resource usage monitoring results violate the policy, triggering an update of the policy.

In an implementation, before the transmitting, the method further comprises the management plane entity: receiving configuration instructions; and, configuring the policy based on the received configuration instructions.

In an embodiment, a management plane function is provided for configuring a control plane function associated with a network slice available on a network. The management plane function comprising: a network interface for receiving data from and transmitting data to network functions connected to the network; a processor; and a non-transient memory for storing instructions that when executed by the processor cause the management plane function to be configured to: transmit, to a policy control function (PCF), a policy related to network slice operations of the network slice and related to total available network slice resources for the network slice, the policy control function (PCF) operative to apply the policy to configure control plane functions for that network slice.

In an implementation, the management plane function is configured to further transmit, to the PCF, a plurality of policies related to network operations of a corresponding plurality of network slices, and wherein the PCF is further operative to apply each of the derived policies to configure control plane functions for a corresponding one of the plurality of network slices.

In an implementation, the management plane function is, further operative to: based on a network slice resource update trigger, transmit a request to a management and orchestration (MANO) component to reserve resources for the network slice; and, transmit a resource allocation update to a control plane function associated with the network slice.

In an implementation, the management plane entity is further operative to: receive network slice resource usage monitoring results; determine whether the network slice resource usage monitoring results violate the policy; and, if the network slice resource usage monitoring results violate the policy, trigger an update of the policy.

In an implementation, the management plane entity is further operative to: receive configuration instructions; and, configure the policy based on the received configuration instructions.

In an implementation, the policy is further related to network operations of a plurality of network slices, and wherein the PCF is further operative to apply the policy to configure control plane functions for the plurality of network slices.

In an implementation, the management plane entity generates the trigger based on network slice resource usage results.

In an implementation, the management plane entity receives the trigger from a control plane function monitoring network slice resource usage based on the policy.

In an implementation, the received trigger comprises a resource allocation update request.

In an implementation, the control plane function comprises one of: a session management function (SMF); and, an access and mobility management function (AMF).

In an implementation, the management plane entity receives the network slice resource usage monitoring results from an operations system entity available in a management plane of the network.

The management plane function of claim 15, wherein the management plane entity is further operative to generate the trigger based on network slice resource usage results.

The management plane function of claim 15, wherein the management plane entity is further operative to receive the trigger from a control plane function network slice resource usage based on the policy.

An object of embodiments of the present invention is to provide a method and apparatus for providing common/slice specific policy configuration of control plane functions (CPF) by the management plane. Further features and advantages of the present invention will become apparent from the following detailed description, taken in combination with the appended drawings.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 1 is a schematic of embodiment of a common control program function of the present invention;

FIG. 2 is a schematic of embodiment of a slice specific control program function of the present invention;

DETAILED DESCRIPTION

Figure 3:
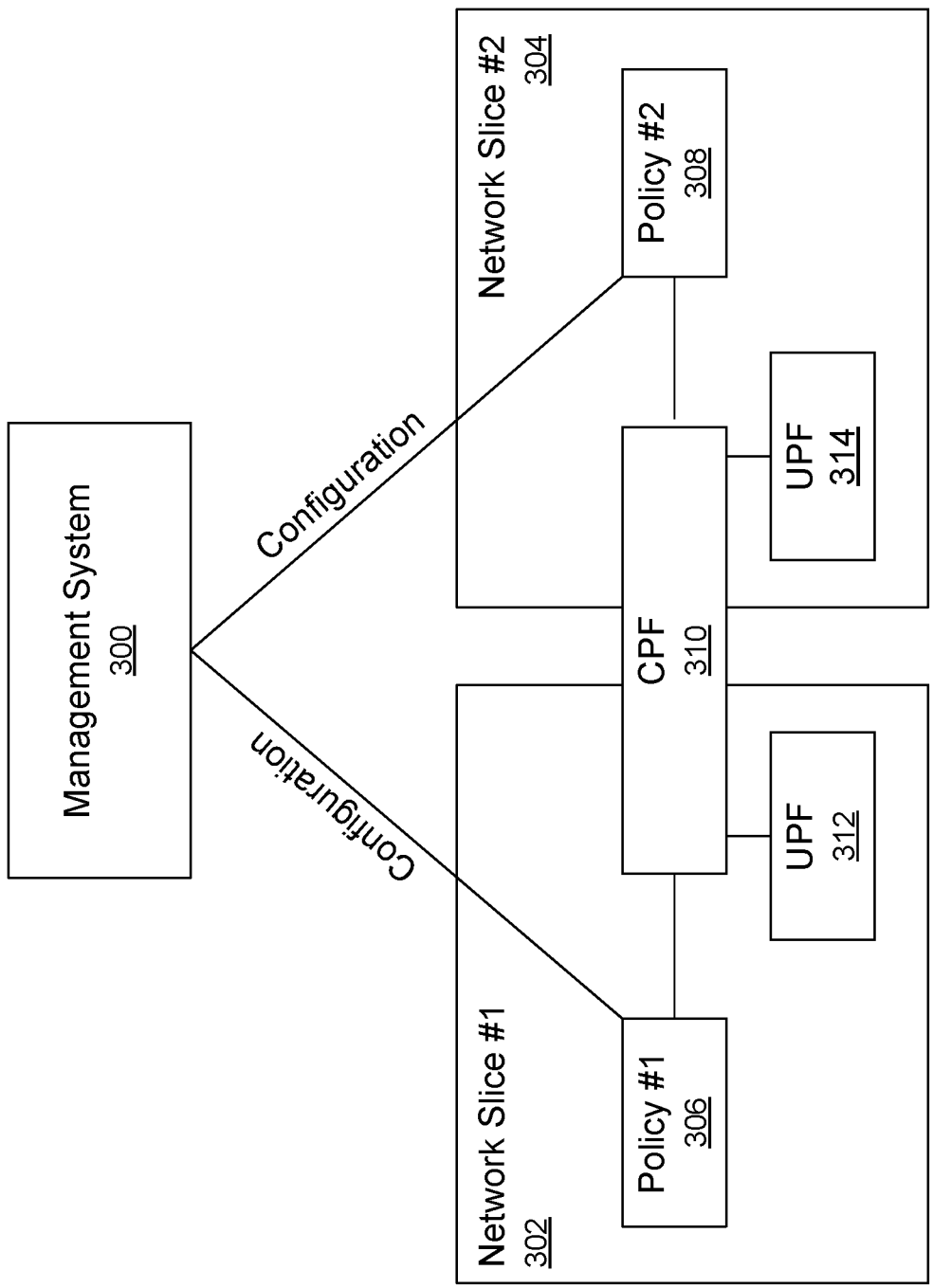
FIG. 3 is a schematic of embodiment of the management component of the present invention where the policies are slice specific and having a common control program function.

The present application provides a method, apparatus and system for policy configuration of network slices by a management system within a network. In embodiments, the present application relates to a method, apparatus and system for policy configuration of a plurality of network slices that avoids negatively affecting services offered by each of those network slices.

Network functions in the control plane are configured with operator's policies defining enforcement of, for example, network related QoS, gating, traffic routing, congestion management, mobility, roaming, etc. In the presence of network slicing, for instance, policies may be used to shape the behaviour of the network slices such that services supported by one slice instance are not negatively affected by services supported by other network slice instances. As described in more detail below, a policy can be slice specific or non-slice specific.

A management function responsible for at least one of determining and managing policies is referred to herein as a policy management function (PMF). Relevant core network functions in the control plane, e.g., policy control function (PCF), can be configured with slice specific/non-slice specific policies that are transmitted by the PMF, to achieve desirable operation of network slice instances.

The present method and system of management support for policy configuration is useful, for instance, in situations in which certain pre-conditions have been put in place. In one embodiment, the network management system will have determined that it is necessary to create a new network slice instance to facilitate a service, and will have also identified the new network functions that need to be configured to create and support this network slice instance, as well as the common network functions that may need to be reconfigured to create and support this network slice instance.

The policy management function (PMF) derives appropriate policies related to core network control plane functions for network slice operation according to service requirements and total available network slice resources. The PMF then transmits configuration instructions, directly or through an intermediate node, that can be used to configure the PCF with slice specific/non-slice specific policies which could be used by certain other core network control plane functions that interface with the PCF, e.g., the session management function (SMF) and access and the access and mobility management function (AMF), to obtain the corresponding policies. An example of a slice specific policy intended for the SMF is, for instance, a limitation that: The total traffic belonging to a specified slice entering/exiting a network node<x bits per second.

Additionally, the above policy may be accompanied by a list of network nodes/time of day where such rate limit applies. Furthermore, the above policy may be accompanied by additional information indicating what action(s) needs to be taken if the rate limit is exceeded. Still further, the control plane network function (CPF), e.g., SMF, or AMF, can operate under the constraints described in the corresponding policy set by the PMF in order to shape proper network behaviour.

As considered by the present invention, policies are sets of conditions, constraints, and settings that shape the network behaviour. These policies, otherwise known as rules, can be applicable to a specific slice or across multiple slices. Examples of these polices can include logical link constraints, e.g. total slice traffic on logical link A<x bps; node constraints, e.g. total slice data traffic entering User Plain Function (UPF) node j<T1 bps, total slice data traffic departing UPF node j<T2 bps, total slice signaling traffic entering Control Plane Function (CPF) node k<T3 bps, total slice signaling traffic departing Control Plane Function (CPF) node k<T4 bps, total slice compute resource usage at Network Function (NF) x<A cores, total slice storage resource usage at NF y<M bytes; and other examples including, traffic routes for slice i is decided according to rule j and how to access which network selection.

An embodiment of the operation of a Control Plane Function (CPF) of the present invention is subject to the constraints outlined in a corresponding policy, or rule. A CPF is a logical entity that carries out a function. These functions can be considered as either slice specific, i.e. applicable to a single slice, or common, i.e. applicable across multiple slices. See, for instance, FIGS. 1 & 2. The common or slice specific CPF performs its job given the policies set by the management system. In the case of a slice specific CPF, the slice specific CPF only deals with traffic/services within the corresponding slice without consideration of traffic from other slices.

FIG. 1 is block diagram illustrating an example of a system according to an embodiment of the present invention in which there is a common CPF 110 shared across a plurality of network slices. The common CPF 110 in this example is operative to apply distinct policies for each of the plurality of network slices. The policies having been originally configured by the PCF. In other embodiments, the CPF 110 may be operative to apply a same policy to one or more of the plurality of network slices. Examples of a CPF include, for instance, a session management function (SMF) (also referred to as a session manager (SM)) or an access and mobility function (AMF).

In the embodiment of FIG. 1, the plurality of network slices comprise two network slices, Network Slice #1 102 and Network Slice #2 104, that are subject to constraints outlined in Policy #1 106 associated with Network Slice #1 102 and Policy #2 108 associated with Network Slice #2 104. The common CPF 110 is in communication with User Plane Function (UPF) 112 of Network Slice #1 102 and UPF 114 of Network Slice #2 104. Policy #1 106 and Policy #2 108 are policies enforced through a PCF (not shown in FIGS. 1 and 2).

FIG. 2 is a block diagram illustrating an example of a system according to the embodiment of the system that incorporates a slice specific CPF 210. In this example, Network Slice 202 includes the slice specific CPF 210, which is subject to constraints outlined in Policy 206 associated with Network Slice #1 202, and is in communication with the UPF 212 of Network Slice #1 202.

In accordance with embodiments of the present invention, there is provided a system for providing policy configuration of control plane functions (CPF) by the management plane in a sliced network, the system comprising: at least one management component configured to provide support for policy configurations of control plane functions and for the monitoring and enforcement of the policy configurations. In examples of this system the policy configurations are slice specific. In other examples of this system, the policy configurations are common across network slices.

In accordance with embodiments of the present invention, there is provided a system for providing policy configuration of control plane functions (CPF) by the management plane in a sliced network, the system comprising: at least one policy management function (PMF) component deriving appropriate policies related to core network control plane functions for network slice operation according to service requirements and total available network slice resources.

The following description illustrates an embodiment of the present invention in which the PMF derives and transmits a policy that relates to resource allocation for a network slice or plurality of network slices. It should be appreciated, that present method and system is not limited to such resource-related polices and that the following description is provided as one example.

Figure 4:
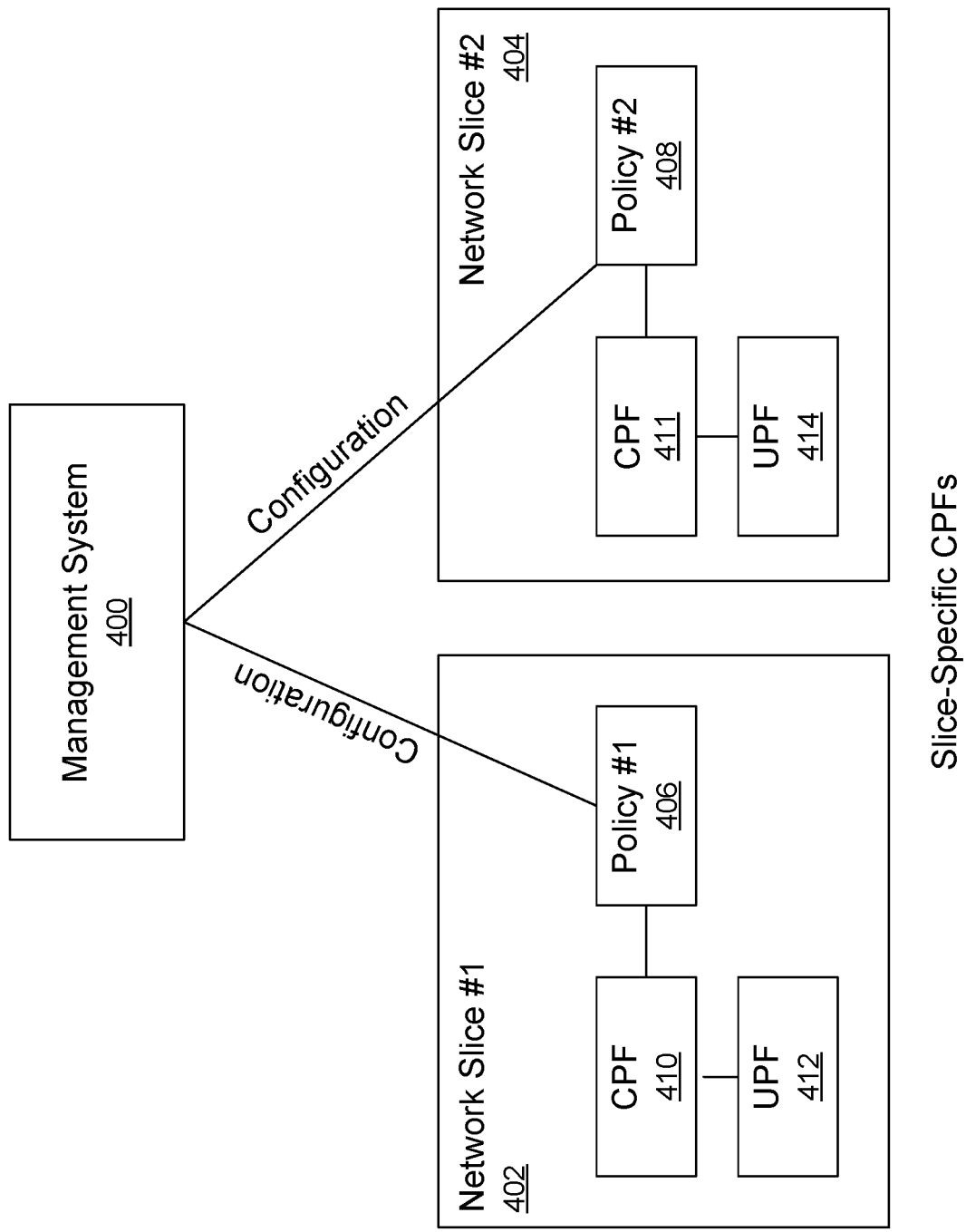
FIG. 4 is a schematic of embodiment of the management component of the system of present invention where the policies are slice specific and having slice specific control program functions.
Figure 5:
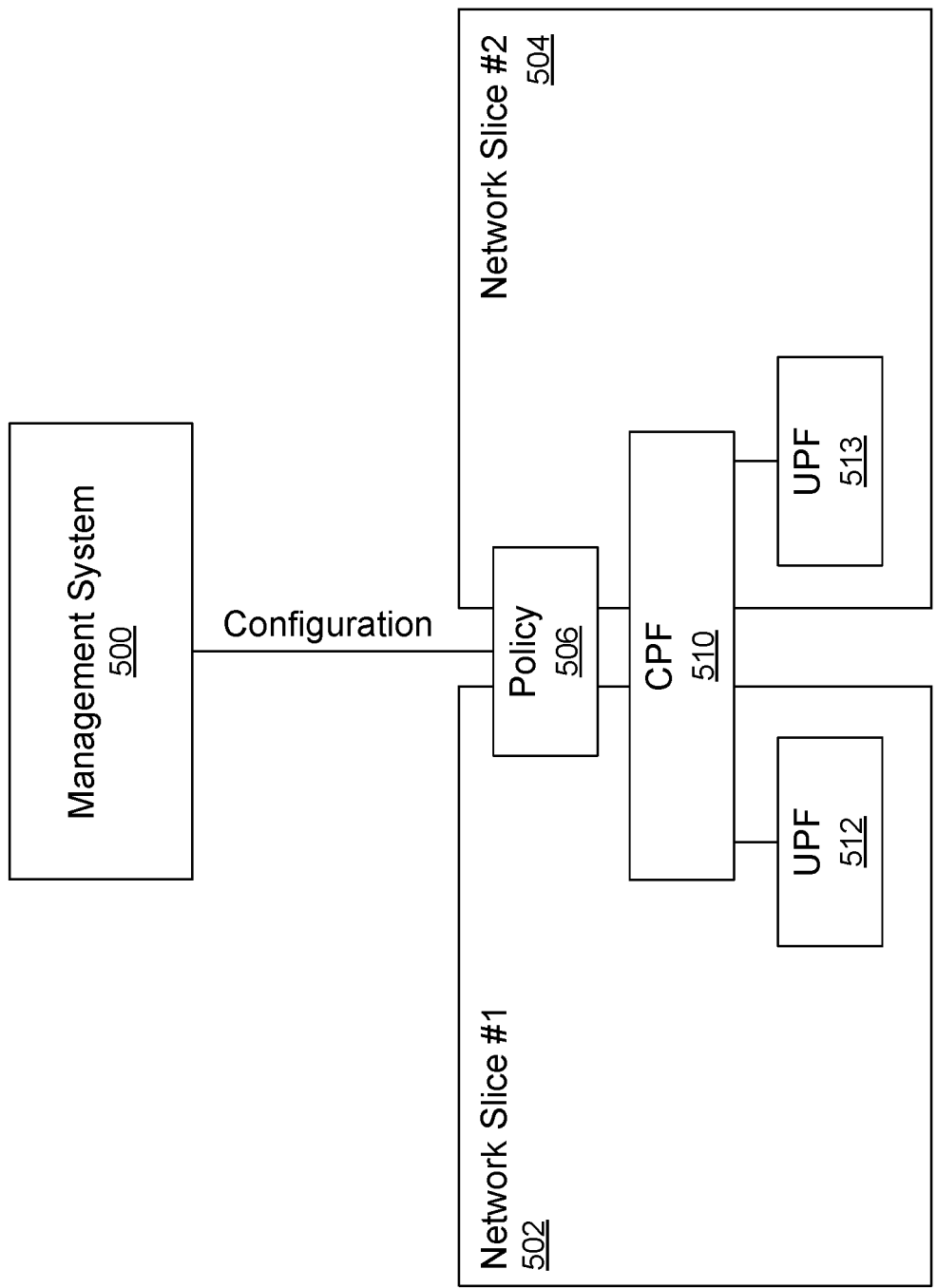
FIG. 5 is a schematic of embodiment of the management component of the system of present invention where the policy is common to more than one slice.

An embodiment of the network management system of the present invention is capable of allocating resources according to service level agreements and the available network resources. This system is capable of allocating resources on a per-slice allotment or across multiple slices. This allocation is performed by configuring the particular policy. As such, the management system may allocate resources collectively for all network slices in order to benefit from multiplexing gains across multiple slices. For example, as illustrated in FIGS. 3 & 4, the management system allocates resources across two network slices by sending configuration instructions relating to Policy #1 and #2 which are associated with Network Slices #1 & 2 respectively. Additionally, as illustrated in FIG. 5, the management system can provide configuration instructions for common policies across multiple slices.

In some embodiments, the management system is operative to monitor network slice resource usage, and to check adherence to one or more polices associated with the network slice based on the monitored network usage. The slice resource usage monitoring may, for instance, be conducted by the management system monitoring individual network function nodes and/or network logical links that may be specified in the one or more polices. Resource consumption at the monitored locations may be evaluated based on the one or more policies to determine whether a resource threshold defined in the one or more policies has been exceeded. Results of the resource usage monitoring may be provided, for instance, to a CPF that is operative to effect traffic adjustments that may affect the network slice. In some embodiments, results of the resource usage monitoring may be provided to a CPF to evaluate based on a corresponding policy available to the CPF. The CPF may be further operative to trigger a network slice resource allocation or a network slice resource (re)configuration based on the received resource usage monitoring results. In some embodiments, the CPF may be operative to trigger the network slice allocation/(re)configuration based on a determination that the received resource usage monitoring results indicate a violation of a policy governing that network slice. The violation may, for instance, be a determination that a threshold set in a slice specific policy was exceeded.

With reference to FIG. 3, in an embodiment a Management system 300 allocates resources across two network slices, Network Slice #1 302 and Network Slice #2 304. The Management System 300 sends configuration instructions relating to a policy #1 306, of Network Slice #1 302. For instance, a PMF within the management system 300 may configure the policy #1 306. The policy #1 306 sets constraints for a common CPF 310 in relation to its function in Network Slice #1 302, for example its communication with UPF 312. The Management System 300 also sends a separate set of configuration instructions relating to policy #2 308 of Network Slice #2 304. For instance, a PMF within the management system 300 may configure the policy #2 308. The policy #2 308 also sets constraints for the CPF 310 in relation to its function in Network Slice #2 304, for example its communication with UPF 314.

With reference to FIG. 4, another example of the embodiment in which a Management System 400 allocates resources across two network slices, Network Slice #1 402 and Network Slice #2 404. The Management System 400 sends configuration instructions relating to policy #1 406, of Network Slice #1 402. Policy #1 406 sets constraints for a slice specific CPF 410 in relation to its function in Network Slice #1 402, for example its communication with UPF 412. Management System 400 also sends a separate set of configuration instructions relating to policy #2 408 of Network Slice #2 404. Policy #2 408 also sets constraints for slice specific CPF 411 in relation to its function in Network Slice 404, for example its communication with UPF 414.

With reference to FIG. 5, another example of embodiment in which a Management System 500 allocates resources across two network slices, Network Slice #1 502 and Network Slice #2 504. The Management System 500 sends configuration instructions relating to a common policy 506, which relates to resource allocation for both Network Slice #1 502 and Network Slice #2 504. The common policy 506 sets constraints for common CPF 510 in relation to its function in Network Slices 502 and 504, for example its communications with UPF 512 and UPF 513.

Figure 6:
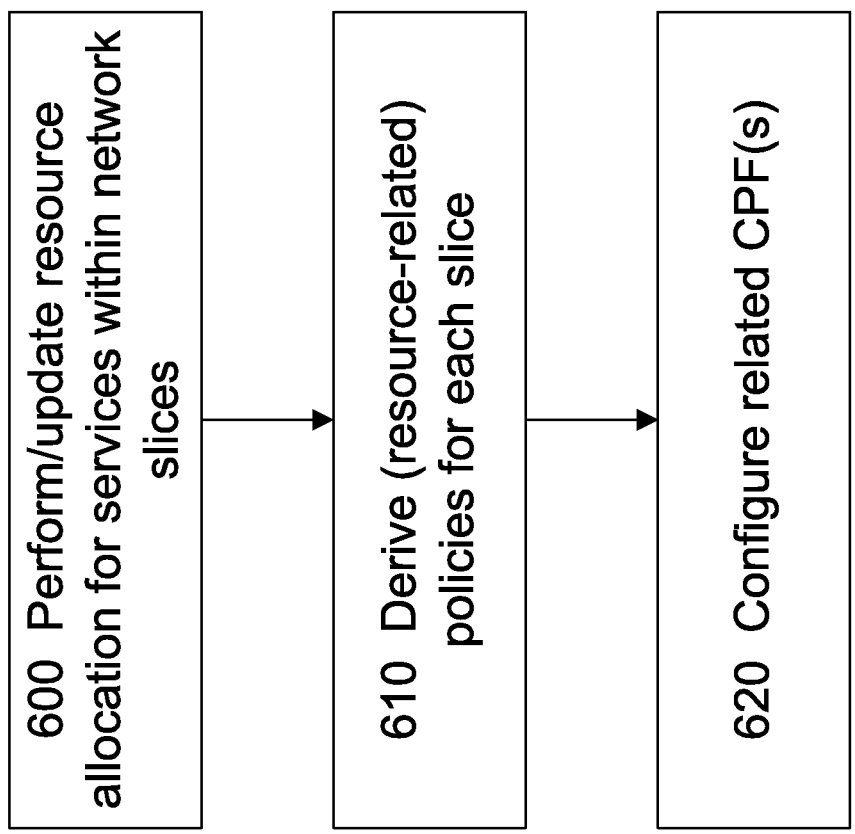
FIG. 6 is a flow chart of embodiment of management component of present invention.

FIG. 6 is a flow chart illustrating a method that can be carried out by a node or function such as a policy management function of embodiments of the management system of the present invention. In this illustration there is disclosed a method that can be carried out by a function such as the policy management function (PMF) within the management system that, at step 600, allows for the allocation of resources for services within the network slices.

The policy management function (PMF), or other entity within the management plane, can then, at step 610, derive resource-related policies for each slice and, at step 620, provide configuration instructions, or configuration information, to the associated CPF(s) accordingly. The policy management function (PMF), or other such node, is capable of adjusting the resources according to the needs of the network. If the resources allocated to one slice are taxed, or insufficient for the demand, the management system can redirect resources from another less taxed, or possibly a non-taxed, slice to the taxed slice.

As indicated in FIG. 6, the step 600 may further relate to an update of resource allocation for services within network slices, where a network slice is being reconfigured or updated.

The policy management function (PMF), or other entity within the management plane, may, at step 610, derive policies for each slice and, at step 620, provide configuration instructions, or configuration information, to the associated CPF(s) to configure the related CPF(s) accordingly. In some embodiments, the polices may comprise resource-related policies.

Another embodiment of the management system of the present invention is directed toward the monitoring and enforcement of the policies. The management system monitors, on a per slice basis, the resource usage and checks for adherence to the applicable policies. This involves monitoring individual Network Frame (NF) nodes/logical links that are specified in the policy. The results of these monitors can be made available to the associated CPFs in order to make traffic adjustments. The resource allocation or configuration can be caused to happen, otherwise known as being triggered, from one of a number of mechanisms, such as: trigger according to policy violations through an Operations System (OS) such as one defined by 3GPP TS 32.401 Performance Management (PM); Concepts and Requirements (Release 13) within the management system, e.g. violation of thresholds set in a slice specific policy, or a trigger by a CPF.

Figure 7:
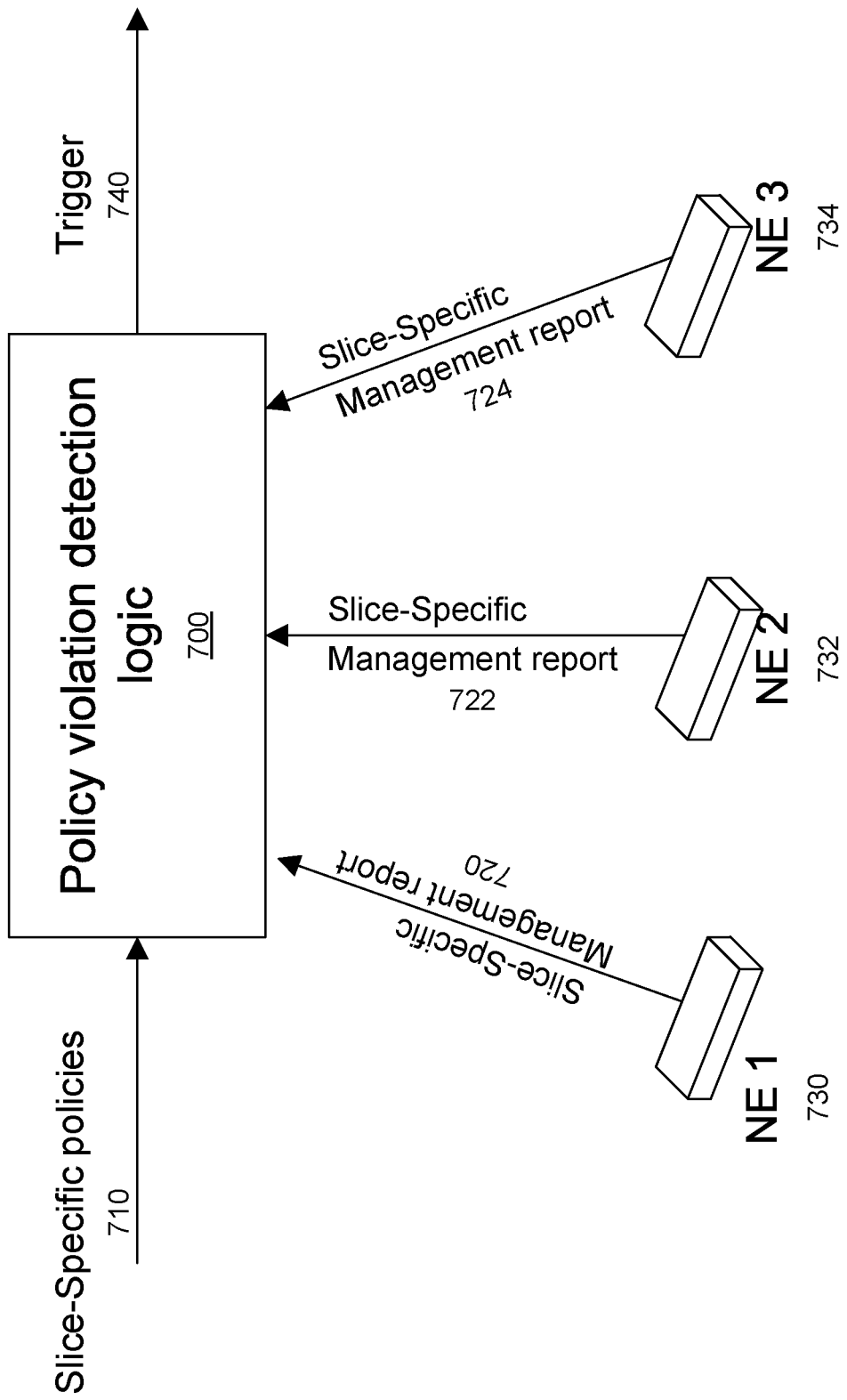
FIG. 7 is a schematic of embodiment of the monitoring/enforcement component of the present invention where triggering is according to policy thresholds.

FIG. 7 is an illustration of an embodiment of a method for a resource allocation update according to a policy violation. The OS in the management plane can include a policy violation detection logic 700 therein. It receives the slice specific polices 710 and slice specific measurement reports 720, 722, 724 from multiple network elements (NEs) 730, 732, 734. If there has been a violation of one or more policies, it transmits an instruction (e.g. a trigger 740) to initiate a resource allocation update by the policy management function (PMF) of the management system to occur to resolve the violation. See FIG. 8. In greater detail, when the OS determines there is a violation and triggers an update, it can send a request for an update to the network slice manager (NSM) within the management system, which in turn communicates with a management and orchestration (MANO) component. The MANO acknowledges the communication. NSM can then acknowledge the request to the OS and send an update to a network function or node responsible for enforcement of the policy. The policy enforcement entity can, in turn, update the element management system (EMS), which is an interface between the management system and the CPF. The EMS can then provide an update to the CPF, which by way of example in this embodiment is the session manager (SM). See, FIG. 9.

Figure 8:
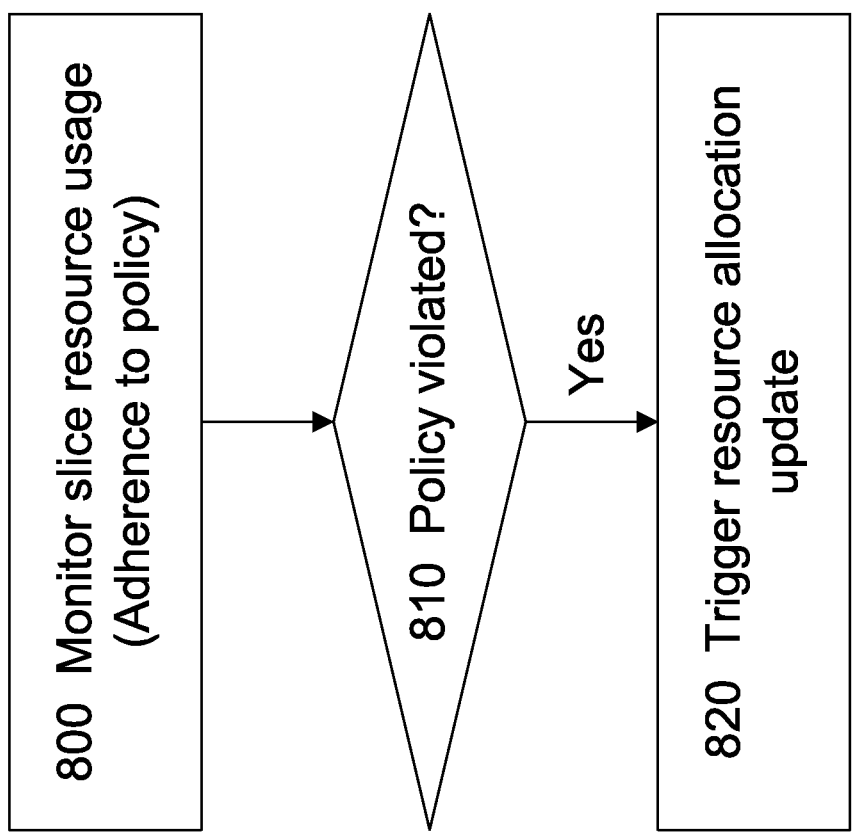
FIG. 8 is a flow chart of the embodiment of the monitoring/enforcement component of the present invention of shown in FIG. 7.

Referring to FIG. 8, an embodiment of a method for network slice resource usage monitoring and updating network slice resource allocation based on the monitored resource usage. At step 800, an Operations System (OS) in the management system continually monitors network slice resource usage for adherence to (i.e. compliance with) the prescribed policy. For instance, the monitoring may include monitoring a resource consumption or traffic performance as defined in a slice specific policy or a common policy. In combination with the monitoring, if at determination step 810, the OS determines that there is a violation of the policy, for instance that current resources are insufficient for the network slice to provide services that meet the policy constraints, then at step 820 the OS triggers an update of the resource allocation to the network slice to ensure compliance with the policy. In some embodiments, the triggering may be performed by a CPF, such as the AMF or the SMF (also called a session manager (SM)), and the trigger may be transmitted by the CPF to the management system. In these embodiments, the CPF may be further operative to receive a trigger response from the management system. The trigger response may, in some embodiments, include configuration information to change a resource allocation of the slice.

Figure 9A:
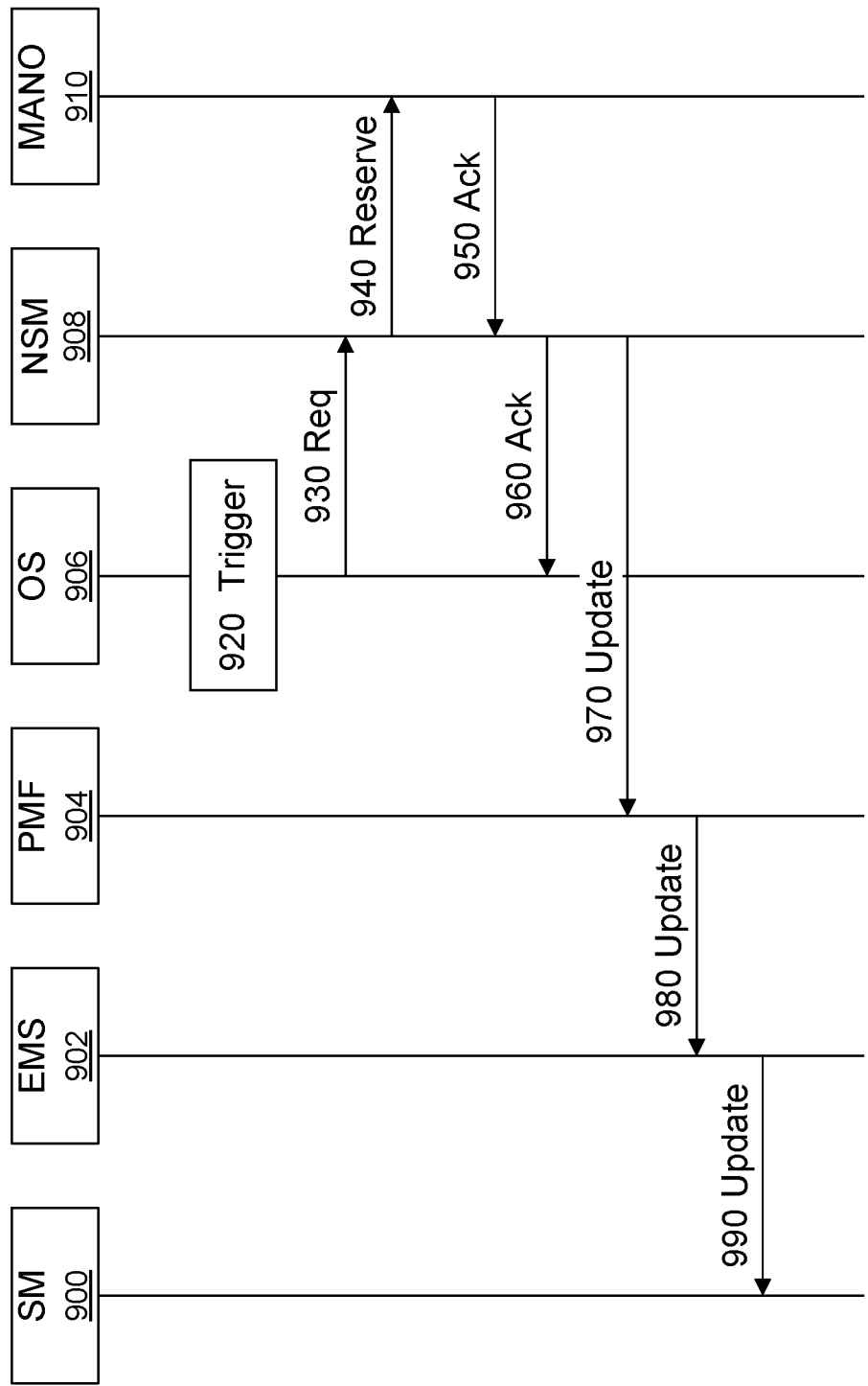
FIG. 9A illustrates an embodiment of the management system of the present invention having an monitoring/enforcement component being triggered according to policy thresholds.

FIG. 9A is a signal flow diagram illustrating an embodiment of updating network slice resource allocation, for instance by updating a policy that governs the resources allocated to that network slice. In the embodiment of FIG. 9, at step 920 the OS 906 of the management system triggers a policy update. Note, FIG. 11 illustrates an alternate embodiment where a CPF (e.g. SM 1100) triggers the update. The trigger may, for instance, be result from a determination that network slice resource usage has violated a policy that governs operation of that network slice. At step 930, the OS 906 sends a request for a resource allocation update to the network slice manager (NSM) 908 within the management system. The NSM 908, at step 940, transmits a request to a management and orchestration (MANO) component 910 to reserve resources for usage by the slice. In this explanation it is assumed that the slice resource usage monitoring has indicated that there are insufficient resources to meet the slice resource demands and comply with the policy. The MANO 910 reserves the requested resources and transmits an acknowledgement to the NSM 908 at step 950 confirming the reservation of the requested resources. In a situation where the MANO 910 is unable to reserve the requested resources, the MANO 910 may be operative to transmit a negative acknowledgement to the NSM 908, the negative acknowledgement confirming receipt of the request but indicating that the requested resources were not/could not be reserved by the MANO 910. This negative acknowledgement operation is not illustrated in FIG. 9A.

At step 960, the NSM 908 transmits to the OS 906 an acknowledgement to the request for a resource allocation update. In step 970 the NSM 908 transmits a resource update to a network function or node responsible for enforcement of the policy, which, in this example, is the Policy Management Function (PMF) 904. In step 980 the PMF 904 transmits a resource allocation update to the CPF via an element management system (EMS) 902. The EMS 902 operative as an interface between the management system and the CPF. At step 990, EMS 902 transmits a resource allocation update to the CPF, which by way of example in this embodiment is the session manager (SM) 900.

Figure 9B:
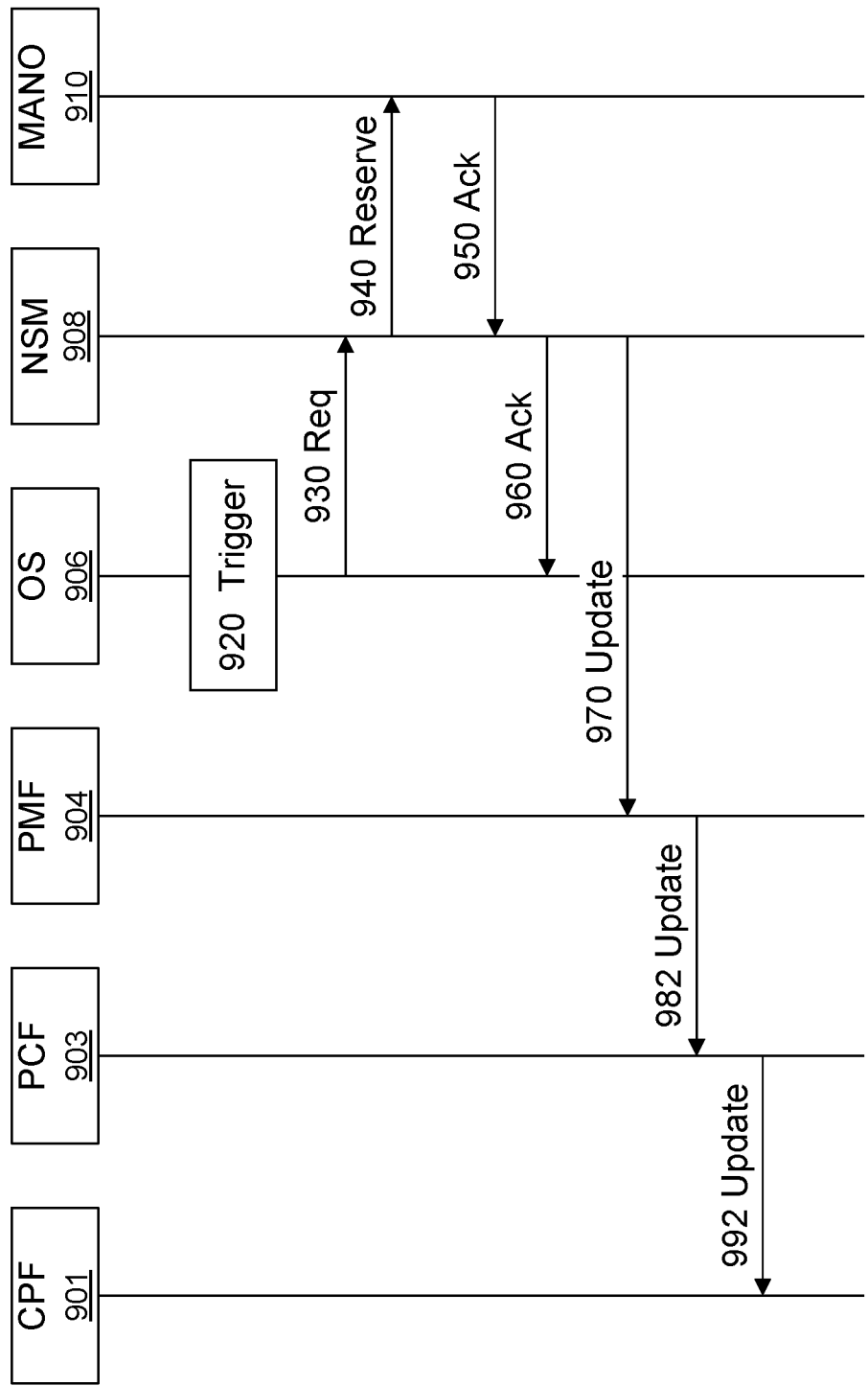
FIG. 9B illustrates an embodiment of the management system of the present invention having an monitoring/enforcement component being triggered according to policy thresholds.
Figure 11A:
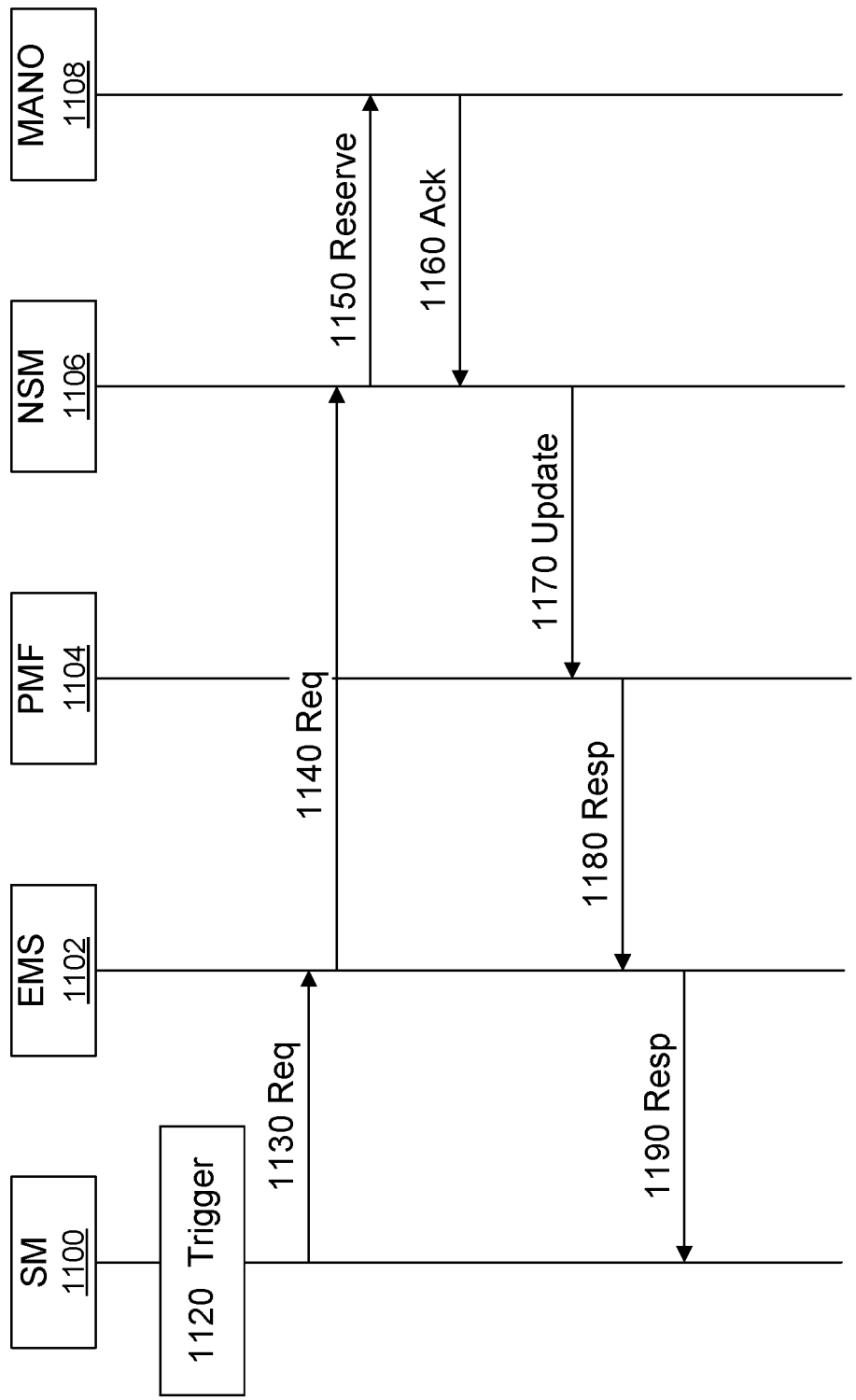
FIG. 11A illustrates an embodiment of the management system of the present invention having a monitoring/enforcement component being triggered at the control plane function level.
Figure 11B:
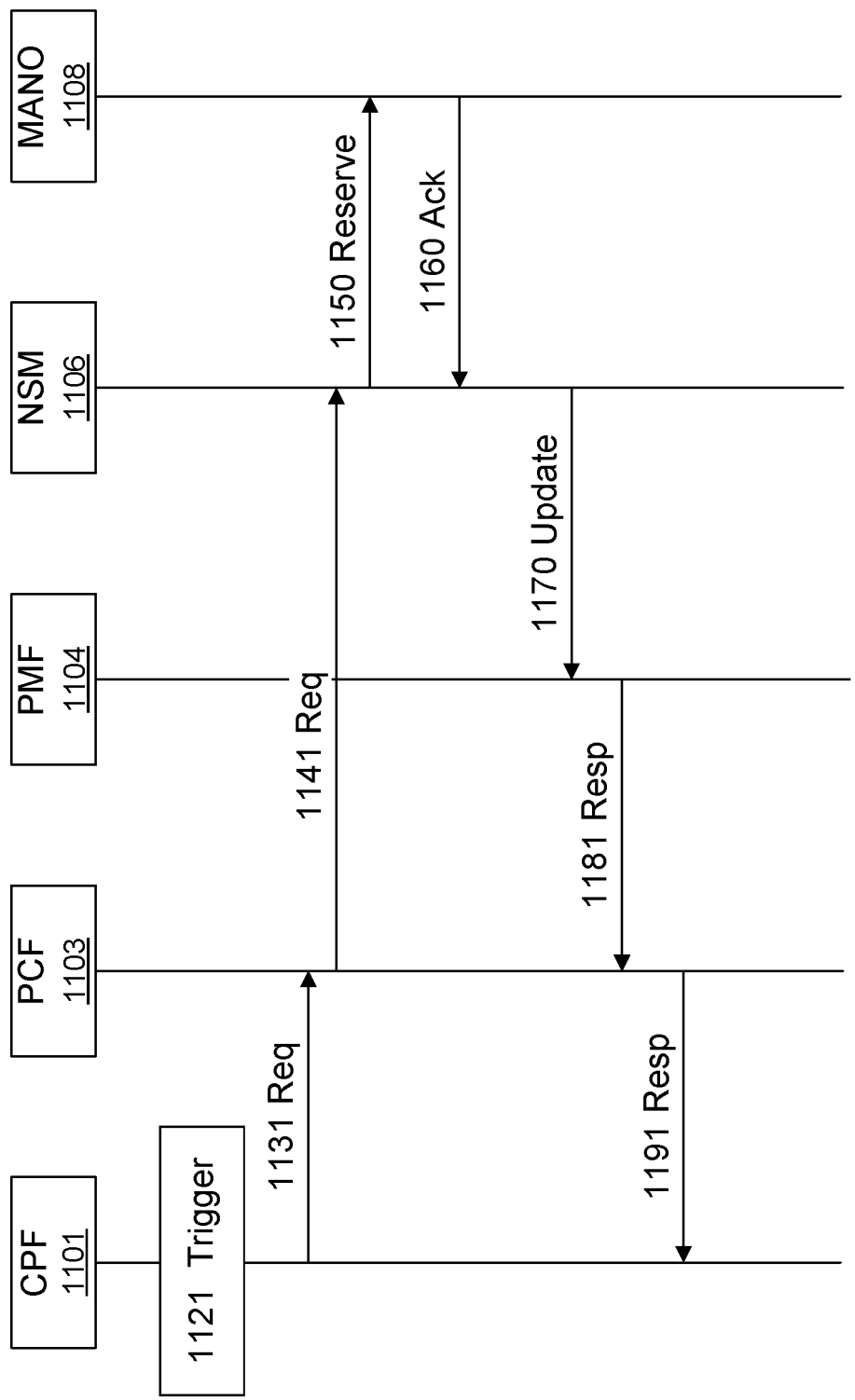
FIG. 11B illustrates an embodiment of the management system of the present invention having a monitoring/enforcement component being triggered at the control plane function level.

FIG. 9B is a signal flow diagram illustrating an embodiment of updating network slice resource allocation, for instance by updating a policy that governs the resources allocated to that network slice. In the embodiment of FIG. 9, at step 920 the OS 906 of the management system triggers a policy update. Note, FIGS. 11A & 11B illustrate an alternate embodiment where a CPF (e.g. SMF or AMF) triggers the update. The trigger may, for instance, be result from a determination that network slice resource usage has violated a policy that governs operation of that network slice. At step 930, the OS 906 sends a request for a resource allocation update to the network slice manager (NSM) 908 within the management system. The NSM 908, at step 940, transmits a request to a management and orchestration (MANO) component 910 to reserve resources for usage by the slice. In this explanation it is assumed that the slice resource usage monitoring has indicated that there are insufficient resources to meet the slice resource demands and comply with the policy. The MANO 910 reserves the requested resources and transmits an acknowledgement to the NSM 908 at step 950 confirming the reservation of the requested resources. In a situation where the MANO 910 is unable to reserve the requested resources, the MANO 910 may be operative to transmit a negative acknowledgement to the NSM 908, the negative acknowledgement confirming receipt of the request but indicating that the requested resources were not/could not be reserved by the MANO 910. This negative acknowledgement operation is not illustrated in FIG. 9B.

At step 960, the NSM 908 transmits to the OS 906 an acknowledgement to the request for a resource allocation update. In step 970 the NSM 908 transmits a resource update to a network function or node responsible for enforcement of the policy, which, in this example, is the Policy Management Function (PMF) 904. In step 982 the PMF 904 transmits a resource allocation update to the CPF via the PCF 903. The PCF 903 operative as an interface between the management system and the CPF. At step 992, PCF 903 transmits a resource allocation update to the CPF 901.

Figure 10:
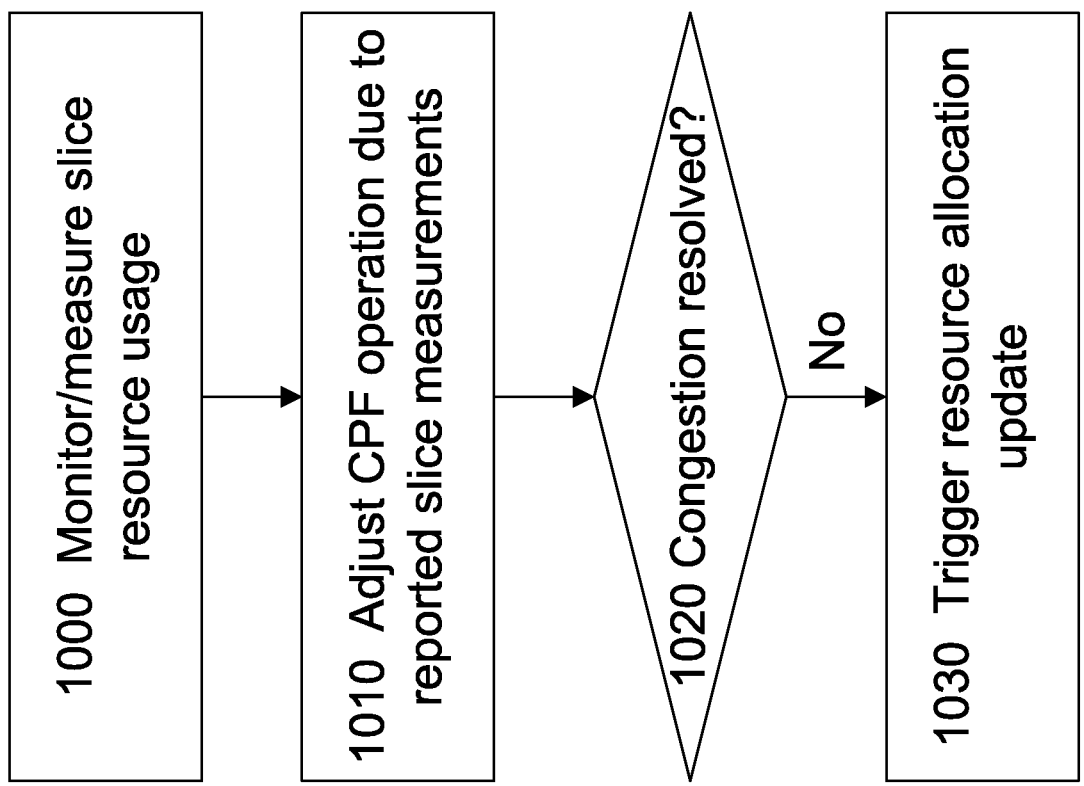
FIG. 10 is a flow chart of the additional embodiment of the monitoring/enforcement component of the present invention where triggering is performed at the control program function level.

FIG. 10 is a flow chart illustrating an embodiment of a method of triggering a resource allocation update according to a CPF. In this illustrated embodiment, at step 1000, a function within the management system can monitor and measure resource usage within the slice. The slice specific measurement reports can then be provided to the CPF. When the CPF determines there is congestion or other traffic issue, it can adjust its operation at step 1010. If, at step 1020, it is determined that there is no resolution to the congestion as a result of the adjustments, or if there is an insufficient improvement, the CPF can trigger a resource allocation update at step 1030.

In greater detail, when the CPF determines there is a violation and triggers an update in step 1030, it can send a request to the EMS, which in turn may send a request to the NSM. The NSM can communicate with the management and orchestration (MANO) component. The MANO can acknowledge the receipt of the NSM communication. NSM can acknowledge the receipt of the request to the OS and send an update to the policy. The policy, in turn, updates the element management system (EMS), which is an interface between the management system and the CPF. The EMS then provides an update to the CPF, which in this embodiment is the session manager (SM).

The example of FIG. 10 uses congestion as an example of a metric that may be monitored and evaluated by the CPF (e.g. a session manager (SM)/session management function (SMF), or access and mobility function (AMF) to determine network slice resource usage. In other embodiments, traffic flow rates, or other metrics may be used by the CPF. In some embodiments, the CPF may be operative to adjust its operation at step 1010 to affect network traffic to ensure compliance with the policy. In these embodiments, the CPF may be further operative to iteratively adjust its operation and evaluate the resource usage monitoring results to determine if the CPF operation change has resolved a policy violation. In the event the CPF operation adjustment is unable to resolve the policy violation, such as congestion exceeding a policy-defined threshold, then the CPF may trigger a network slice resource allocation update (step 1030), for instance by transmitting a request for a network slice resource allocation upstate to the management system.

FIG. 11A is a signal flow diagram that provides details of an embodiment of a process for updating a policy when the CPF (in this example, the CPF is SM 1100) has determined, based on network slice resource usage monitoring results, that there is a policy violation (e.g. see FIG. 10). Using the example of the SM 1100 as the CPF, in step 1120 the SM 1100 triggers a network slice resource allocation update. In step 1130 the SM 1100 transmits a resource allocation request to the management system. In this example, the resource allocation request is transmitted to the EMS 1102 of the management system. In step 1140 the EMS 1102 transmits a request to the NSM 1108. In step 1150, the NSM 1108 transmits to a management and orchestration (MANO) component 1110 a reserve request to reserve resources for allocation to the network slice. In step 1160, the MANO 1110 transmits to the NSM 1106 an acknowledgement of the reserve request confirming the reservation of the requested resources. In a situation where the MANO 1108 is unable to reserve the requested resources, the MANO 1108 may be operative to transmit a negative acknowledgement to the NSM 1106, the negative acknowledgement confirming receipt of the request but indicating that the requested resources were not/could not be reserved by the MANO 1108. This negative acknowledgement operation is not illustrated in FIG. 11A.

The NSM 1108 may transmit the acknowledgement received from the MANO 1108 to the OS of the management system (not shown in FIG. 11A). In step 1170, the NSM 1108 transmits a policy update to the PMF 1104 based on the resource reservation acknowledgement received from the MANO 1108. The policy update may, for instance, indicate a change in the resource allocation and associated policy constraints for the network slice. In step 1180 the PMF 1104 transmits a reserve request response to the element management system (EMS) 1102, which is an interface between the management system and the CPF (e.g. SM 1100). In step 1190, the EMS 1102 transmits a reserve request response to the CPF, which in this embodiment is the SM 1100.

FIG. 11B is a signal flow diagram that provides details of an embodiment of a process for updating a policy when the CPF 1101 has determined, based on network slice resource usage monitoring results, that there is a policy violation (e.g. see FIG. 10). In step 1121 the CPF 1101 triggers a network slice resource allocation update. In step 1131 the CPF 1101 transmits a resource allocation request to the PCF 1103. In step 1141 the PCF 1103 transmits a request to the NSM 1108. In step 1150, the NSM 1108 transmits to a management and orchestration (MANO) component 1110 a reserve request to reserve resources for allocation to the network slice. In step 1160, the MANO 1110 transmits to the NSM 1106 an acknowledgement of the reserve request confirming the reservation of the requested resources. In a situation where the MANO 1108 is unable to reserve the requested resources, the MANO 1108 may be operative to transmit a negative acknowledgement to the NSM 1106, the negative acknowledgement confirming receipt of the request but indicating that the requested resources were not/could not be reserved by the MANO 1108. This negative acknowledgement operation is not illustrated in FIG. 11B.

The NSM 1108 may transmit the acknowledgement received from the MANO 1108 to the OS of the management system (not shown in FIG. 11B). In step 1170, the NSM 1108 transmits a policy update to the PMF 1104 based on the resource reservation acknowledgement received from the MANO 1108. The policy update may, for instance, indicate a change in the resource allocation and associated policy constraints for the network slice. In step 1181 the PMF 1104 transmits a reserve request response to the PCF 1103, which is an interface between the management system and the CPF 1101. In step 1191, the PCF 1103 transmits a reserve request response to the CPF 1101.

Figure 12:
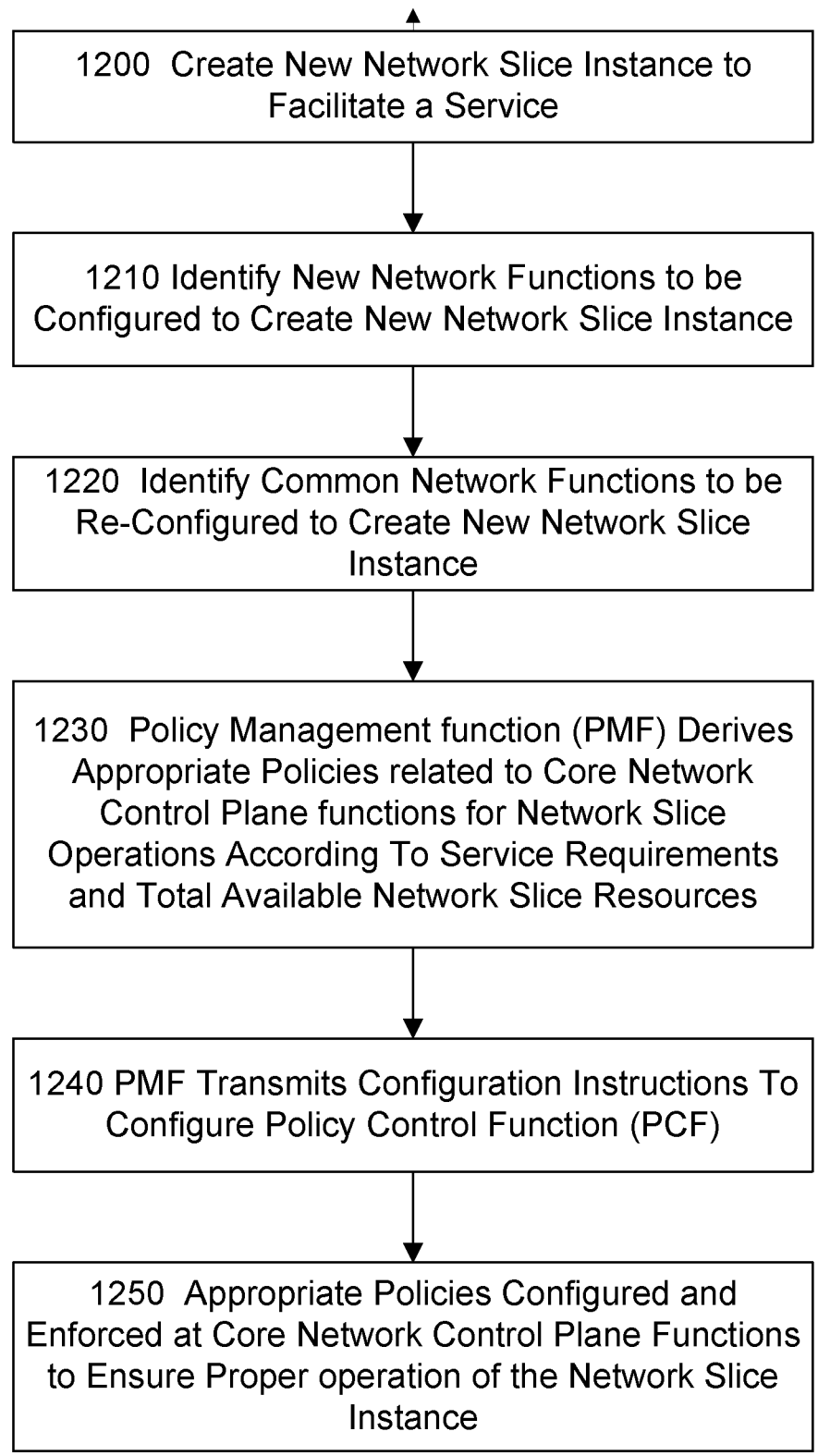
FIG. 12 is a flow chart of an additional embodiment of the management system of the present invention.

As illustrated in FIG. 12, an additional embodiment of the present invention is directed toward policy configuration by the management system. Network functions in the control plane are configured with operator's policies defining enforcement of network related QoS, gating, traffic routing, congestion management, mobility, roaming, etc. In the presence of network slicing, policies may be used to shape the behaviour of network slices such that services supported by one slice instance are not negatively affected by services supported by other network slice instances. A policy can be slice specific or non-slice specific. An example for slice specific policy can be shown by policy for PDU session establishment/modification/termination by the session management function (SMF) for a given network slice instance. Additionally, some UE-related policies, e.g., mobility management policy or policy for network selection, may be non-slice specific.

The management function in charge of at least one of determining and managing policies is called policy management function (PMF). Relevant core network functions in the control plane, e.g., policy control function (PCF), can be configured with slice specific/non-slice specific policies to achieve desirable operation of network slice instances.

The policy management function (PMF) derives appropriate policies related to core network control plane functions for network slice operation according to service requirements and total available network slice resources. The PMF transmits configuration instructions, directly or through an intermediate node, that can be used to configure the PCF with slice specific/non-slice specific policies which could be used by certain other core network control plane functions which have interface to PCF, e.g., SMF and access and mobility management function (AMF), to obtain the corresponding policies. An example of a slice specific policy intended for SMF is as follows:

total traffic belonging to a specified slice entering/exiting a network node<x bits per second.

Additionally, the above policy may be accompanied by a list of network nodes/time of day where such rate limit applies. Furthermore, the above policy may be accompanied by the information on what needs to be done if the rate limit is exceeded. Still further, the control plane network function, e.g., SMF, or AMF, can operate under the constraints described in the corresponding policy set by PMF in order to shape proper network behaviour.

This embodiment can occur when the network management system has decided to create a new network slice instance to facilitate a service, along with identifying the new network functions and common network functions that need to be reconfigured in order to create the new network slice. Further, once the appropriate polices have been created, they can be configured and enforced at core network control plane functions to ensure the proper operation of the network slice instances.

Referring to FIG. 12, a flow diagram illustrating an embodiment of a process for a management system to support network slice policy configuration. In some embodiments, as indicated in FIG. 12, the management system may further comprise the policy management function (PMF) and/or a Policy Control Function (PCF). In some embodiments the PMF and/or PCF may not be considered part of the management system, but interoperate with the management system to support network slice policy configuration.

Prior to implementation of the present method and system of management support for policy configuration, certain pre-conditions may be put in place. In particular, it is assumed that the network management system has determined to create a new network slice instance to facilitate a service. Furthermore, that the network management system has identified the network functions that need to be instantiated and/or configured to create this network slice instance, along with the common network functions that need to be reconfigured to create and/or support this network slice instance.

In step 1200 the management system has determined that it is necessary to create a new network slice instance to facilitate a service. The management service proceeds to create the new network slice instance by, for instance, transmitting a request to allocate network resources to a MANO. In step 1210 the management system identifies new network functions to be configured to create and support the new network slice instance. In step 1220, the management system identifies common network functions that may need to be re-configured to create and/or support the new network slice instance. In step 1230, a policy management function (PMF) derives appropriate network slice policies related to core network control plane functions for network slice operations according to service requirements and the total available allocated network slice resources. In step 1240 the PMF transmits configuration instructions to a Policy Control Function (PCF). The configuration instructions including, for instance, policy constraints associated with the new network slice instance.

The PMF is responsible for generating and maintaining policies for use by core network control plane functions when managing associated network slices. In order to meet service requirements, the PMF may be operative to update the policies, to change the behavior of the core network control plane functions when acting on the associated network slices.

Figure 13:
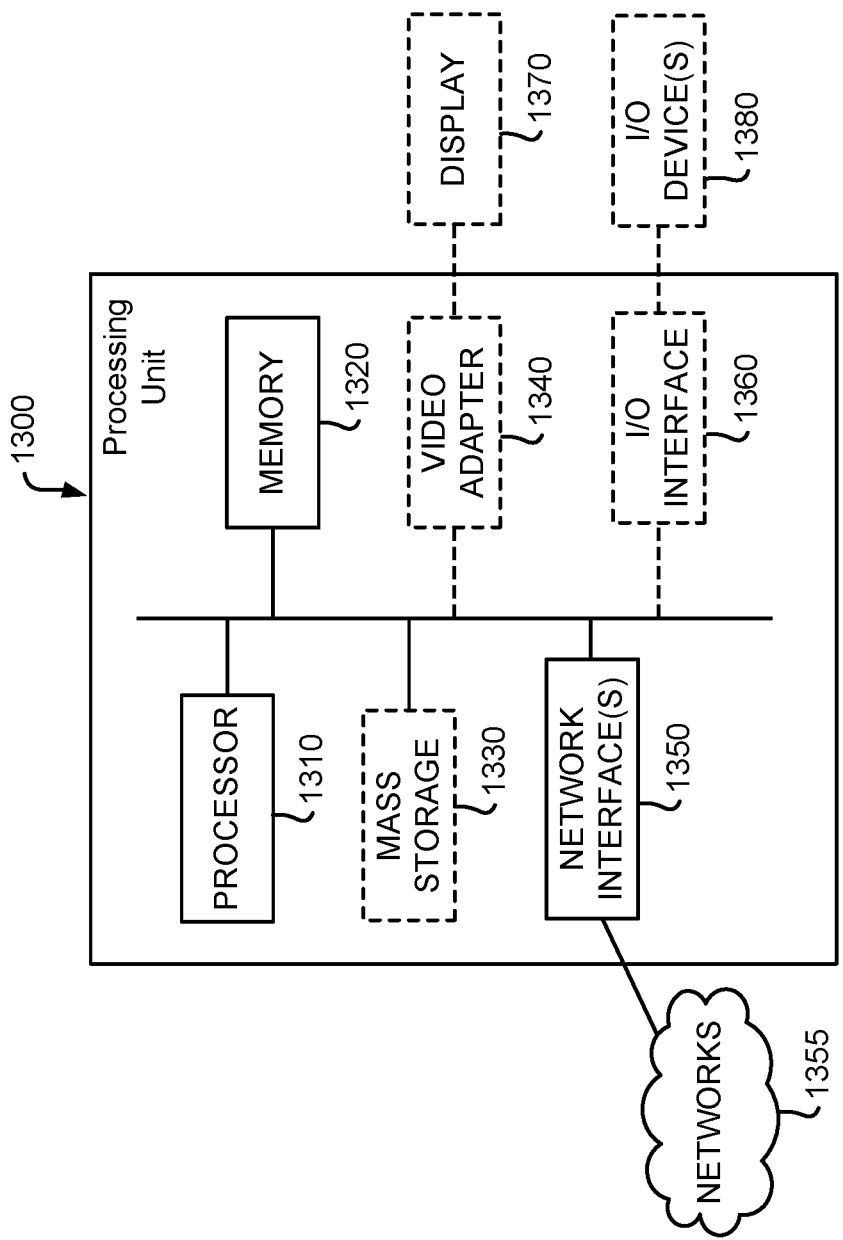
FIG. 13 illustrates configurations of an apparatus according to the present invention.

FIG. 13 illustrates an embodiment of a general purpose computing platform that may be employed to carry out the method and message exchanges described above. Entities within the management plane and the control plane may be implemented through either dedicated hardware, or through general purpose hardware executing instructions stored in a memory. When stored instructions are executed, processing platform can act as a dedicated network function. Such a platform can be used to provide the functionality of entities within either the management plane or control plane (or the user/data plane) of networks as described above.

FIG. 13 is block diagram of a computing system that may be used for implementing the devices and methods disclosed herein. In particular, the network nodes may each include one or more computing systems. The network functions described above may be instantiated by execution on one or more computing systems. In some aspects, a network function may be instantiated across a plurality of computing systems across a plurality of geographic locations. The UE described above may comprise a computing system adapted to perform the methods described herein.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system includes a processing unit 1300. The processing unit 1300 typically includes a central processing unit (CPU) 1310, a bus and a memory 1320, and may optionally also include a mass storage device 1330, a video adapter 1340, and an I/O interface 1360 (each shown in dashed lines to indicate they are optional). The computing system may further include one or more network interface(s) 1350 for connecting the computing system to communication networks 1355.

The CPU may comprise any type of electronic data processor, and may include one or more cores or processing elements. The memory may comprise any type of non-transitory system memory such as static random access memory (SRAM), dynamic random access memory (DRAM), synchronous DRAM (SDRAM), read-only memory (ROM), or a combination thereof. In an embodiment, the memory may include ROM for use at boot-up, and DRAM for program and data storage for use while executing programs. The bus may be one or more of any type of several bus architectures including a memory bus or memory controller, a peripheral bus, or a video bus.

The mass storage may comprise any type of non-transitory storage device configured to store data, programs, and other information and to make the data, programs, and other information accessible via the bus. The mass storage may comprise, for example, one or more of a solid state drive, hard disk drive, a magnetic disk drive, or an optical disk drive.

The video adapter 1340 and the I/O interface 1360 provide optional interfaces to couple external input and output devices to the processing unit. Examples of input and output devices include a display 1370 coupled to the video adapter 1340 and an I/O device 1380 such as a touch-screen coupled to the I/O interface 1360. Other devices may be coupled to the processing unit, and additional or fewer interfaces may be utilized. For example, a serial interface such as Universal Serial Bus (USB) (not shown) may be used to provide an interface for an external device. Alternatively, the computing system may rely upon the network interface(s) for connection to available mass storage(s), video adapter(s), and I/O interface(s) available on the networks.

Figure 14A:
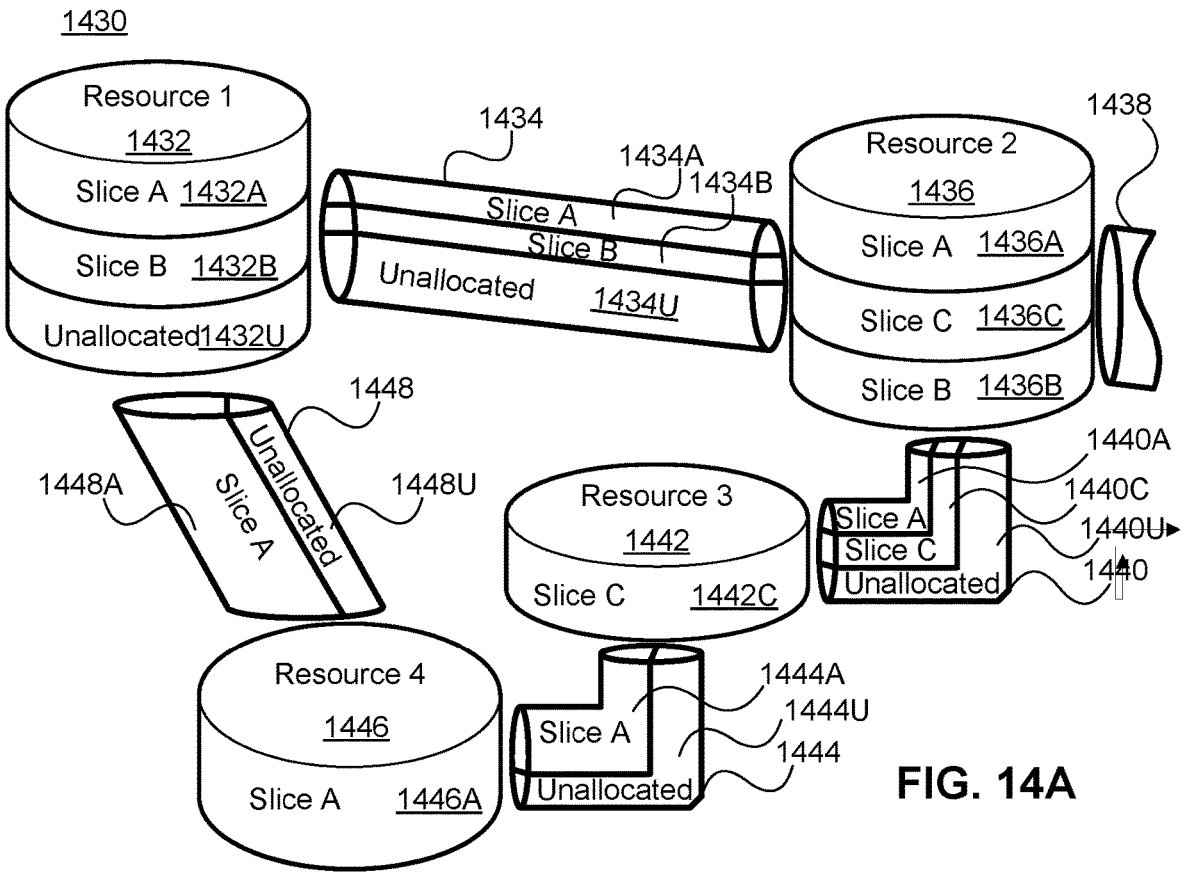
FIG. 14A is a block diagram schematically illustrating an architecture in which network slicing can be implemented.

FIG. 14A illustrates an architecture 1430 that connects a plurality of connectivity, compute and storage resources, and supports network slicing. In the following, resources are connected to other discrete resources through Connectivity Resources 1434 1438, 1440, 1444 and 1448. It will be understood that as network functions are instantiated within resources, they may be connected to each other by virtual connections that in some embodiments do not rely upon the physical connectivity resources illustrated, but instead may be connected to each other by virtual connections, which will also be considered as connectivity resources. Resource 1 1432 is connected to Resource 2 1436 by Connectivity Resource 1434. Resource 2 1436 is connected to unillustrated resources through Connectivity Resource 1438, and is also connected to Resource 3 1442 by Connectivity Resource 1440. Resource 4 1446 is connected to Resource 3 1442 through Connectivity Resource 1444, and to Resource 1 1432 by Connectivity Resource 1448. Resource 1 1432, Resource 2 1436, Resource 3 1442 and Resource 4 1446 should be understood as representing both compute and storage resources, although specialized functions may also be included. In some embodiments a specialized network function may be represented by any or all of Resource 1 1432, Resource 2 1436, Resource 3 1442 and Resource 4 1446, in which case, it may be the capability or capacity of the network function that is being sliced. Connectivity Resources 1434, 1438, 1440, 1444 and 1448 may be considered, for the following discussions, as logical links between two points (e.g. between two data centers) and may be based on set of physical connections.

Resource 1 1432 is partitioned to allocate resources to Slice A 1432A, and Slice B 1432B. A portion 1432U of the resources available to Resource 1 1432 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 1434 is partitioned to provide connectivity to Slice A 1434A and Slice B 1434B, and also retains some unallocated bandwidth 1434U. It should be understood that in any resource that either has unallocated resources or that has been partitioned to support a plurality of resources, the amount of the resource (e.g. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, an anticipated resource need, or other such factors, alone or in combination with each other. In some embodiments the allocation of resources may be in the form of soft slices in which a fixed allocation is not committed and instead the amount of the resource provided may be flexible. In some embodiments, a soft allocation may allocate a percentage the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 1436 is partitioned to support allocations of the available compute and storage resources to Slice A 1436A, Slice C 1436C and Slice B 1436B. Because there is no allocation of resources in connectivity resource 1434 to Slice C, Resource 2 1436 may, in some embodiments, not provide a network interface to Slice C 1436C to interact with connectivity resource 1434. Resource 2 1436 can provide an interface to different slices to Connectivity Resource 1438 in accordance with the slices supported by Connectivity Resource 1438. Connectivity Resource 1440 is allocated to Slice A 1440A and Slice C 1440C with some unallocated capacity 1440U. Connectivity Resource 1440 connects Resource 2 1436 with Resource 3 1442.

Resource 3 1442 provides compute and storage resources that are allocated exclusively to Slice C 1442C, and is also connected to Connectivity Resource 1444 which in addition to the unallocated portion 1444U includes an allocation of Connectivity Resource 1444A to slice A. It should be noted that from the perspective of functions or processes within Slice A, Resource 3 1442 may not be visible. Connectivity Resource 1444 provides a connection between Resource 3 1442 and Resource 4 1446, whose resources are allocated entirely to Slice A 1446A. Resource 4 1446 is connected to Resource 1 1432 by Connectivity Resource 1448, which has a portion of the connection allocated to Slice A 1448A, while the balance of the resources 1448U are unallocated.

Figure 14B:
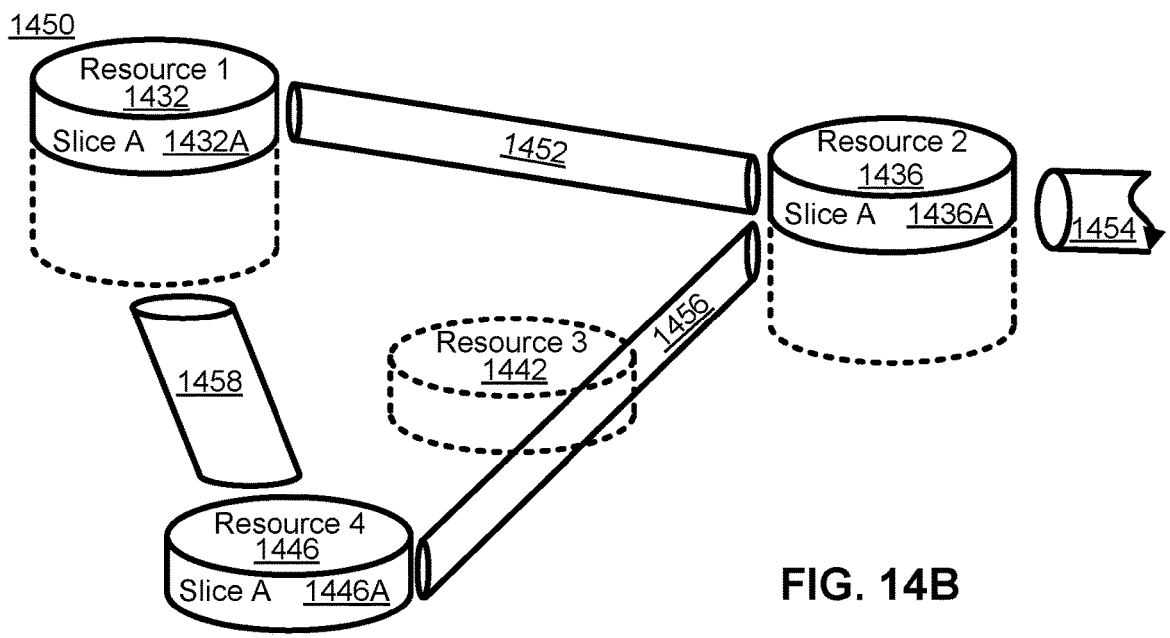
FIG. 14B is a block diagram illustrating the architecture discussed in FIG. 14-A from the perspective of a single slice.

FIG. 14B illustrates the view of the architecture 1436 of Figure X-A as would be seen from the perspective of Slice A. This may be understood as a view of the resources allocated to Slice A 1450 across the illustrated network segment. From within Slice A 1450, only the portions of the resources that have been allocated to Slice A 1450 are visible. Thus, instead of being able to see the full capacity and capability of Resource 1 1432, the capabilities and capacity of the portion allocated to Slice A 1432A is available. Similarly, instead of being able to see the capacity and capabilities of Resource 2 1436, only the capabilities and capacity of the portion allocated to Slice A 1436A are available. Because nothing from Resource 3 1442 had been allocated to Slice A 1450, Resource 3 1442 is not present within the topology of Slice A 1450. All of the capacity and capability of Resource 4 1446 was allocated to Slice A 1446, and as such is present within Slice A 1450. Slice A 1432A of Resource 1 1432 is connected to Slice A 1436A of Resource 2 1436 by logical link 1452. Logical Link 1452 may correspond to the portion of connectivity resource 1434 allocated to Slice A 1434A. Slice A 1436A is connected to logical link 1454 (representative of the portion of connectivity resource 1438 allocated to Slice A 150), and is connected to Slice A 1446A by logical link 1456. Logical link 1456 is representative of the portions of connectivity resource 1440 and connectivity resource 1444 that have been allocated to Slice A (portions 1440A and 1444A respectively). It should be understood that due to the absence of Resource 3 1442 from Slice A 1450, any traffic transmitted by Slice A 1436A onto Connectivity Resource 1440A will be delivered to Resource 4 1446, and similarly any traffic transmitted from Slice 1446A into Connectivity Resource 1444A will be delivered to Slice A 1436A. As such, within Slice A 1450, Connectivity Resources 1440A and 1444A can be modelled as a single logical link 1456. Logical link 1458 is representative of the portion of Connectivity Resource 1448 allocated to slice A 1448A.

It should be understood that within the storage and compute resources illustrated in FIGS. 14A and 14B, network functions can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their core networks, next generation networks, including so-called Fifth Generation (5G) networks, are expected to use NFV and other related technologies as fundamental building blocks in the design of a new Core Network (CN) and Radio Access Network (RAN). By using NFV, and technologies such as Software Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may be combined with a sense of topological closeness to select a logical location at which to instantiate a function so that it is geographically or topologically close to a selected physical or network location.

Figure 15:
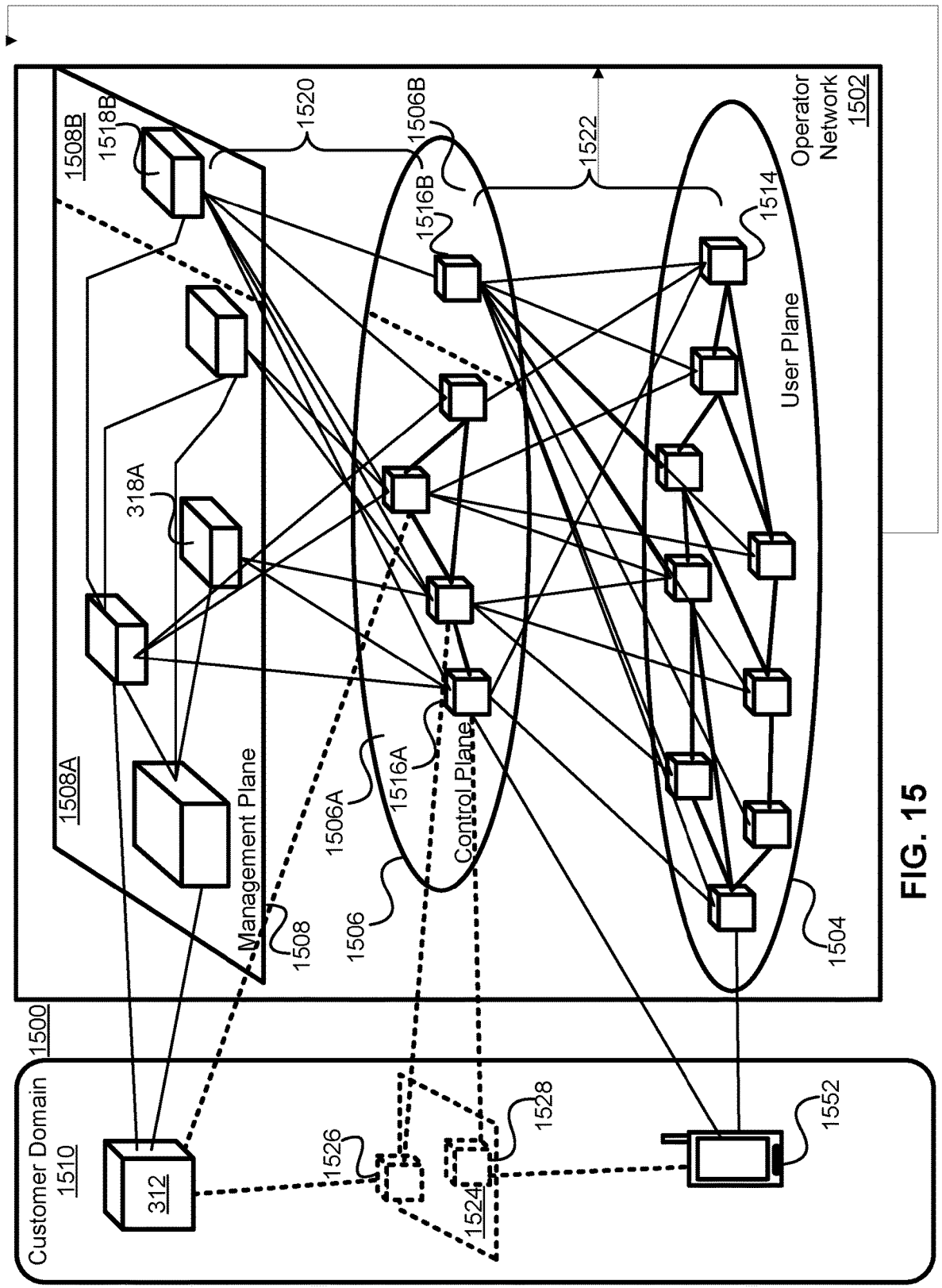
FIG. 15 is a diagram illustrating an embodiment of interactions between the Management Plane, Control Plane and User Plane of a network.

FIG. 15 illustrates a network architecture 1500 in which the resources of the operator network 1502 are divided into a set of logical planes, a User Plane (UP) 1504, a Control Plane (CP) 1506 and a Management Plane (MP) 1508. The UP 1504 is typically focussed on packet transport, but certain functions including packet filtering and traffic shaping can be performed in the UP 1504, although this is typically performed based on instructions from a network function in the CP 1506. Functions in the MP 1508 receive input from network functions within the customer domain 1510 about the policies that should be enforced by the network control functions in the control plane 1506. If Operator Network 1502 supports network slicing, functions within MP 1508 may be responsible for slice design and creation. It should be understood that a single MP 1508 may be used to provide management functionality for a plurality of network slices that each have different control and user planes. Functions within the MP 1508 can communicate with each other to ensure that the differing policies for a possible plurality of customers are fitted together in a suitable set of instructions.

UP 1502 may also be referred to as a data plane. It carries the traffic between an ED 1552 and either external data networks (not shown) or functions within the operator network. UP 1502 is typically composed of User Plane Functions (UPFs) 1514. In some instances, a UPF 1514 may be specific to a particular UE, it may be specific to a particular service (in some embodiments, it may be both user and service specific), and in other instances it may be a generic function serving a plurality of users and services. UPFs 1514 are connected to each other to allow for data plane traffic to be transmitted.

The Control Plane 1506 may be composed of control plane functions (CPF) 1516. In a 3GPP compliant network, some control plane functions 1516A have functions defined by standards, while other control plane functions 1516B may be outside the specification of the relevant standards. This may effectively result in the control plane 1506 being divided into a standards compliant control plane segment 1506A and a non-standards compliant control plane segment 1506B. In a 3GPP compliant control plane segment 1506A, network functions 1516A such as an AMF, SMF, NEF, AUSF, etc. may be present, and in some embodiments more than one instance of any or all of the functions may be present. In a non-standards compliant control plane segment 1508B, a network function 1516B such as an SDN Controller, or other such controllers including a SONAC-Ops controller, may be instantiated. Control plane functions 1516, may be connected to other CPFs, as shown by functions 1516A, but this is not necessarily required as may be seen by CPF 1516B. ED 52 may also communicate with CPFs.

The Management Plane 1508 can be divided between a standards compliant section 1508A and a non-standards compliant section 1508B, much as CP 1506 is divided. Within MP 1508, network functions and nodes 1518 can communicate with each other, and with a network function or node 1512 within the customer domain 1510. Management Plane entities 1518A (within the standardized section 1508A) and 1518B (within the non-standards compliant section 1508B) can be used to establish policy, and the mechanisms by which policy is to be enforced, based on the resources available and requirements received from the customer 1512 (and possibly a plurality of different customers). Network Management Functions (NMF) 1518 may be responsible for accounting and billing functions, for element management, they may provide the services required for an Operation Support System (OSS) and a Business Support Subsystem (BSS). Outside the standardized functions, non-standardized network functions 1518B may include an NFV-MANO system and a SONAC-Com controller.

NMFs 1518 can receive external input from a customer node 1512, and can communicate with each other. NMFs 1518 can also communicate, over any of the MP-CP connections 1520, with CPFs 1516 to provide instructions about the policies to be enforced by CPFs 1516. Changes in the resources underlying the network 1502 are also communicated by a NMF 1518 to CPFs 1516. In CP 1506, CPFs communicate with each other, and with ED 1552. CPF 1516 are also in communication with UPFs 1514, and through this communication they can receive information such as traffic loads on links and processing loads at network functions. In conjunctions with policy information received from NMFs 1518, a CPF 1516 can transmit instructions to the UPFs 1514, over the CP-UP (also referred to as UP-CP) connections 1522, to govern the behavior of the UPFs 1514. A UPF 1514 receives configuration information from a CPF 1518, and handles UP traffic in accordance with the received configuration information. Loading information (which may include both processing and network connection (or link) loading) may be gathered by a UPF 1514 and provided to a CPF 1516.

In some embodiments, the customer network function 1512 may have a connection to a CFP 1516. This CPF, with which customer network function 1512 communicates, may be either a 3GPP compliant CPF 1516A or a non-3GPP compliant CPF 1516B. In alternate embodiments, the customer network function 1512 may make use of a function within management plane 1508 to relay messages to functions in control plane 1506. Within the customer domain 1510, there may be an optional control plane 1524, with customer control plane functions 1526 and 1528. When such a customer control plane 1524 is present, function 1526 and 1528 may have logical communications links with either or both of ED 1552 and the customer network function 1512. Customer control plane functions 1526 and 1528 may have connections to functions within control plane 1506 (either 3GPP compliant functions 1516A or non-3GPP compliant functions 1516B).

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for configuring control plane functions associated with a network slice available on a network, the method comprising:

receiving, by a first function in a management plane of the network, usage monitoring results of network slice resources, the network slice resources including connectivity, computing, and storage resources;

determining, by a second function in the management plane of the network, that the usage monitoring results violate a policy related to network slice operations of the network slice and related to total available network resources available to the network slice;

in response to the violation of the policy, triggering, by the second function, an update of the policy based on the usage monitoring results of the network slice resources to obtain an updated policy, the updated policy including a new resource allocation of the network slice resources; and transmitting, by the first function to a control plane function (CPF) of the network, the updated policy, the CPF operative to apply the updated policy to configure the control plane functions associated with the network slice.

2. The method according to claim 1, wherein the policy is further related to network operations of a plurality of network slices, and wherein the CPF is further operative to apply the policy to configure control plane functions for the plurality of network slices.

3. The method according to claim 1, wherein the method further comprises transmitting to the CPF a plurality of policies related to network operations of a corresponding plurality of network slices, the CPF further operative to apply each of the plurality of policies to configure control plane functions for a corresponding one of the plurality of network slices.

4. The method of claim 1, further comprising:
based on the triggering of the update of the policy, transmitting, by the first function, a request to a management and orchestration (MANO) component to reserve network slice resources for the network slice; and
transmitting the new resource allocation to the CPF.

5. The method of claim 4, wherein the method further comprises:
monitoring the network slice resources usage, by the CPF or a Network Management Function (NMF), to obtain the usage monitor results based on the policy, and sending the usage monitoring results to the first function.

6. The method of claim 5, wherein the triggering of the update of the policy comprises sending a resource allocation update request.

7. The method of claim 1, wherein the CPF comprises one of:
a session management function (SMF); and,
an access and mobility management function (AMF).

8. The method according to claim 1, wherein the first function is an operations system entity available in a management plane of the network, and the second function is the CPF or a Network Management Function (NMF).

9. The method of claim 1 wherein the updating of the policy is performed by the CPF or a Network Management Function (NMF).

10. A system for configuring a control plane function associated with a network slice available on a network, the system comprising:
a plurality of network nodes coupled to the network, each of the plurality of network nodes including:
a network interface for connecting to the network;
a processor; and
a non-transient memory for storing instructions that when executed by the processor of each of the plurality of network nodes configure the plurality of network nodes:
receive, by a first function in a management plane of the network, usage monitoring results of network slice resources, the network slice resources including connectivity, computing, and storage resources;
determine, by a second function in the management plane of the network, that the usage monitoring results violate a policy related to network slice operations of the network slice and related to total available network resources available to the network slice;
in response to the violation of the policy, trigger, by the second function, an update of the policy based on the usage monitoring results of the network slice resources to obtain an updated policy, the updated policy including a new resource allocation of the network slice resources; and
transmit, by the first function to a control plane function (CPF) of the network, the updated policy, the CPF operative to apply the updated policy to configure control plane functions associated with the network slice.

11. The method of claim 10 wherein the updating of the policy is performed by the CPF or a Network Management Function (NMF).

12. The system according to claim 10, wherein the policy is further related to network operations of a plurality of network slices, and wherein the CPF is further operative to apply the policy to configure control plane functions for the plurality of network slices.

13. The system according to claim 10, wherein the system is configured to further transmit, to the CPF, a plurality of policies related to network operations of a corresponding plurality of network slices, and wherein the CPF is further operative to apply each of the derived policies to configure control plane functions for a corresponding one of the plurality of network slices.

14. The system of claim 10, further operative to:
based on the triggering of the update of the policy, transmit, by the first function, a request to a management and orchestration (MANO) component to reserve network slice resources for the network slice; and,
transmit the new resource allocation to the CPF.

15. The system of claim 14, further operative to: monitor the network slice resources usage, by the CPF or a Network Management Function (NMF), to obtain the usage monitoring results based on the policy, and send the usage monitoring results to the first function.

16. The system of claim 15, wherein the triggering of the update of the policy comprises sending a resource allocation update request.

17. The system of claim 10, wherein the control plane function CPF comprises one of:
a session management function (SMF); and,
an access and mobility management function (AMF).

18. The system according to claim 10, wherein the first function is an operations system entity available in a management plane of the network, and the second function is the CPF or a Network Management Function (NMF).

* * * * *